United States Patent
Sone et al.

(10) Patent No.: US 10,200,132 B2
(45) Date of Patent: Feb. 5, 2019

(54) OPTICAL COMMUNICATION SYSTEM, TRANSMISSION STATION, AND METHOD OF OPTICAL COMMUNICATION

(71) Applicant: FUJITSU LIMITED, Kawasaki-shi, Kanagawa (JP)

(72) Inventors: Kyosuke Sone, Kawasaki (JP); Yasuhiko Aoki, Yokohama (JP); Goji Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 15/445,169

(22) Filed: Feb. 28, 2017

(65) Prior Publication Data

US 2017/0279538 A1    Sep. 28, 2017

(30) Foreign Application Priority Data

Mar. 25, 2016  (JP) .................. 2016-061846

(51) Int. Cl.
    *H04B 10/572*    (2013.01)
    *H04B 10/2575*   (2013.01)
    *H04Q 11/00*     (2006.01)

(52) U.S. Cl.
    CPC ....... *H04B 10/572* (2013.01); *H04B 10/2575* (2013.01); *H04Q 11/0005* (2013.01); *H04Q 2011/0009* (2013.01)

(58) Field of Classification Search
    CPC .............. H04B 10/572; H04B 10/2575; H04Q 11/0005; H04Q 2011/0009
    See application file for complete search history.

(56) References Cited

U.S. PATENT DOCUMENTS 7,016,608 B1 *  3/2006  Ball ................... H04J 14/0204
                                                        398/58

FOREIGN PATENT DOCUMENTS

JP          2015-84470          4/2015

* cited by examiner

*Primary Examiner* — Leslie C Pascal
(74) *Attorney, Agent, or Firm* — Staas & Halsey LLP

(57) ABSTRACT

An optical communication system includes an optical transmitter, a plurality of optical receivers, and a splitter that splits light transmitted by the optical transmitter to the plurality of optical receivers. The optical transmitter includes a variable-wavelength light source capable of transmitting light of a first wavelength and light of a third wavelength between the first wavelength and a second wavelength. A first optical receiver of the plurality of optical receivers includes a first optical filter having a first transmission band including the first and third wavelengths, and a first receiving unit that receives light having passed through the first optical filter. A second optical receiver of the plurality of optical receivers includes a second optical filter having a second transmission band including the second and third wavelengths, and a second receiving unit that receives light having passed through the second optical filter.

15 Claims, 18 Drawing Sheets

FIG. 11
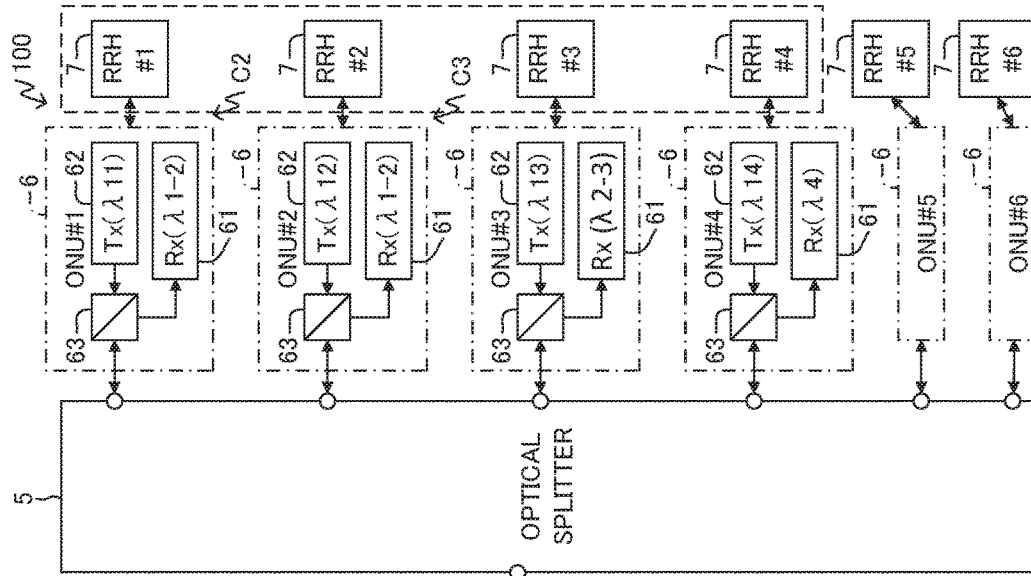
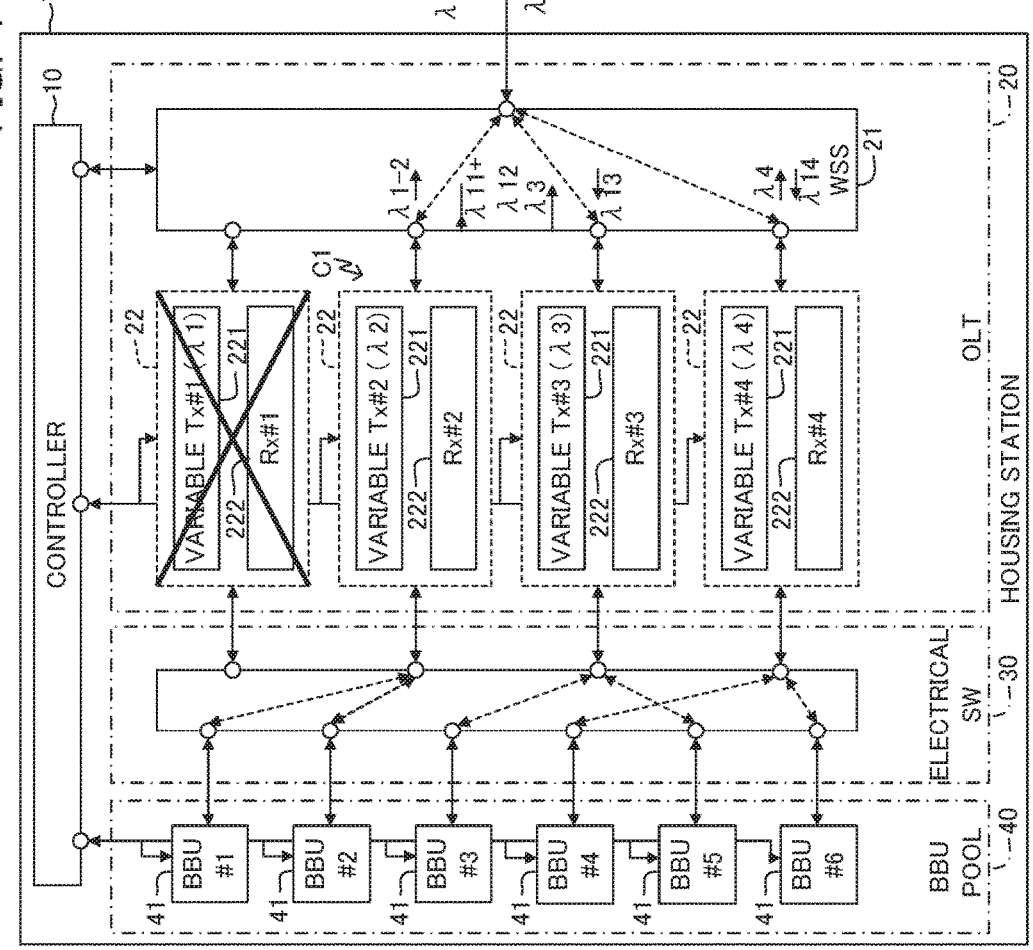

FIG. 17

|  | RRH#1 | RRH#2 | RRH#3 | RRH#4 | RRH#5 | RRH#6 |
|---|---|---|---|---|---|---|
| CONNECTED ONU | ONU#1 | ONU#2 | ONU#3 | ONU#4 | ONU#5 | ONU#6 |
| PEAK TRAFFIC(Gbps) | 10 | 10 | 10 | 10 | 10 | 10 |
| USED TRAFFIC(Gbps) | 3 | 3 | 3 | 3 | 0.5 | 0.5 |

| | ONU#1 | ONU#2 | ONU#3 | ONU#4 | ONU#5 | ONU#6 |
|---|---|---|---|---|---|---|
| ALLOCATED DOWNLINK WAVELENGTH | λ1 | λ2 | λ3 | λ4 | λ3 | λ4 |
| USED BAND(Gbps) | 3 | 3 | 3 | 3 | 0.5 | 0.5 |

(2)

| | λ1 | λ2 | λ3 | λ4 |
|---|---|---|---|---|
| NUMBER OF CONNECTED ONUS | 1 | 1 | 2 | 2 |
| MAXIMUM BAND(Gbps) | 10 | 10 | 10 | 10 |
| USED BAND(Gbps) | 3 | 3 | 3.5 | 3.5 |

OPTICAL COMMUNICATION SYSTEM, TRANSMISSION STATION, AND METHOD OF OPTICAL COMMUNICATION

CROSS-REFERENCE TO RELATED APPLICATIONS

This application is based upon and claims the benefit of priority of the prior Japanese Patent Application No. 2016-061846, filed on Mar. 25, 2016, the entire contents of which are incorporated herein by reference.

FIELD

The embodiment discussed herein is directed to an optical communication system, a transmission station, and a method of optical communication.

BACKGROUND

A passive optical network (PON) system is known as an example of an optical communication system. For the purpose of improving fault tolerance (also referred to as "availability") of a PON system, optical transceiving modules of an active system and a standby system are sometimes provided in an optical line terminal (OLT).

[Patent Document 1] JP 2015-84470 A

When optical transceiving modules of an active system and a standby system are provided in an OLT, the OLT may become complex, the size thereof may increase, and the cost may increase.

SUMMARY

In one aspect, an optical communication system may include an optical transmitter, a plurality of optical receivers, and a splitter that splits light transmitted by the optical transmitter to the plurality of optical receivers. The optical transmitter may include a variable-wavelength light source capable of transmitting light of a first wavelength and light of a third wavelength between the first wavelength and a second wavelength. A first optical receiver of the plurality of optical receivers may include a first optical filter having a first transmission band including the first and third wavelengths, and a first receiving unit that receives light having passed through the first optical filter. A second optical receiver of the plurality of optical receivers may include a second optical filter having a second transmission band including the second and third wavelengths, and a second receiving unit that receives light having passed through the second optical filter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram for describing an example of an operation of handling the faults illustrated in FIG. 10;

FIG. 17 is a diagram illustrating traffic information in the optical communication system according to the modification in a table form; and FIG. 18 is a diagram illustrating wavelength information in the optical communication system according to the modification in a table form.

DESCRIPTION OF EMBODIMENT(S)

Figure 1:
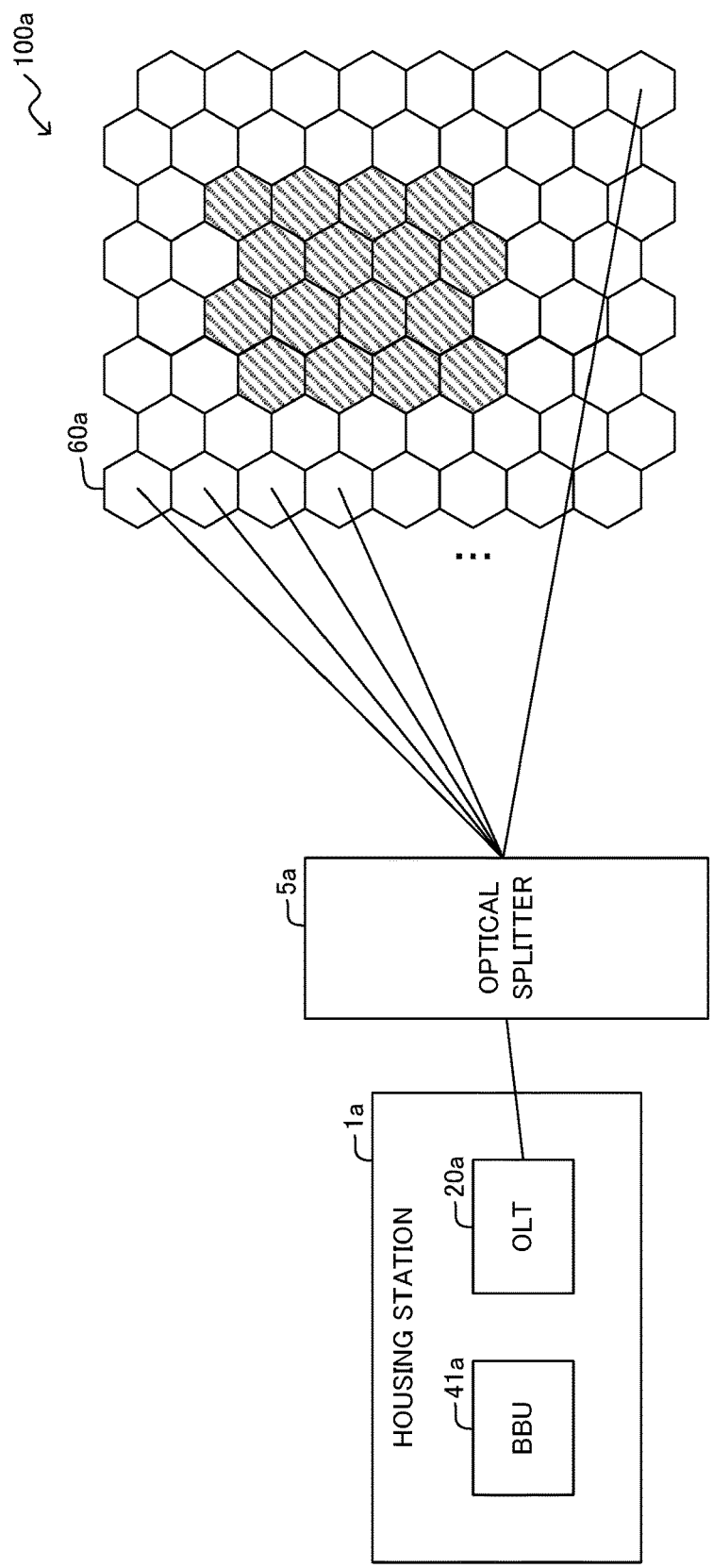
FIG. 1 is a diagram illustrating a first example of high-density cells of an optical communication system.

Hereinafter, embodiment of the invention will be described with reference to the drawings. The following embodiments are given as merely exemplary, and it is not intended to exclude various modifications and various technical applications which are not specified in the embodiment(s). For example, the present embodiment may be carried out in various modified forms without departing from the spirit thereof.

Moreover, each drawing is not intended to include only elements illustrated in the drawing and may include other elements. In the drawings used in the following embodiments, the components denoted by the same symbols represent the same or similar components unless otherwise stated.

[A] Embodiment

In a wireless communication system, a plurality of wireless devices is often arranged at a position geologically distant from a body of a wireless base station (hereinafter sometimes referred to simply as a "base station") and the base station body is often connected to a plurality of wireless transceivers by an optical fiber transmission path, for example.

A "wireless device" is often referred to as a "remote radio head (RRH)". As an example, a RRH can form or provide a wireless area smaller than a wireless area (often referred to as coverage) that a base station body forms or provides. An example of the wireless area is a "cell".

Here, when a wireless base station body and a plurality of RRHs are connected individually by an optical fiber transmission path, since the number of RRHs increases as the number of optical fiber transmission paths increases, it is difficult to say that it is cost-effectively. Therefore, the use of a PON system in the optical connection between the wireless base station body and the plurality of RRHs has been discussed. Such a PON system may be referred to as a "mobile fronthaul network".

For example, an OLT is connected to the wireless base station body, an optical network unit (ONU) is connected to the individual RRHs, and an optical splitter is provided between the OLT and the ONU. Moreover, the OLT and the optical splitter are connected by one optical fiber, and a plurality of ONUs is connected to the optical splitter. In this case, a building or a facility that includes the wireless base station and the OLT may be referred to as a "housing station".

With an increase in mobile traffic in recent years, the traffic in an access area of a mobile fronthaul network or the like that connects an RRH and a housing station also increases. In a wireless cellular system, inter-cell cooperative transmission is performed to suppress interference in cells having a high density (also referred to as "high-density cells"). The "high-density cell" may be a cell 60a present in an area in which the number of cells 60a per unit area is large.

Inter-cell cooperative transmission is also referred to as coordinated multi-point (CoMP) communication. In CoMP communication, two or more RRHs may transmit and receive optical signals of different wavelengths to and from a housing station (also referred to as a "transmission station"). The housing station may include two or more optical transceiving modules corresponding to two or more base stations associated with CoMP communication.

When a fault occurs in any one of the two or more transceiving modules provided in the housing station, an RRH corresponding to the faulty optical transceiving module may be unable to communicate with the housing station using light of the corresponding wavelength.

Although transceiving modules of an active system and a standby system may be provided in the housing station as a countermeasure, the configuration of the housing station may become complex, the size thereof may increase, and the cost may increase.

Therefore, in the embodiment described below, an example of an optical communication system capable of improving fault tolerance even when optical transceiving modules of an active system and a standby system are prepared separately will be described.

[A-1] Example of System Configuration

Figure 2:
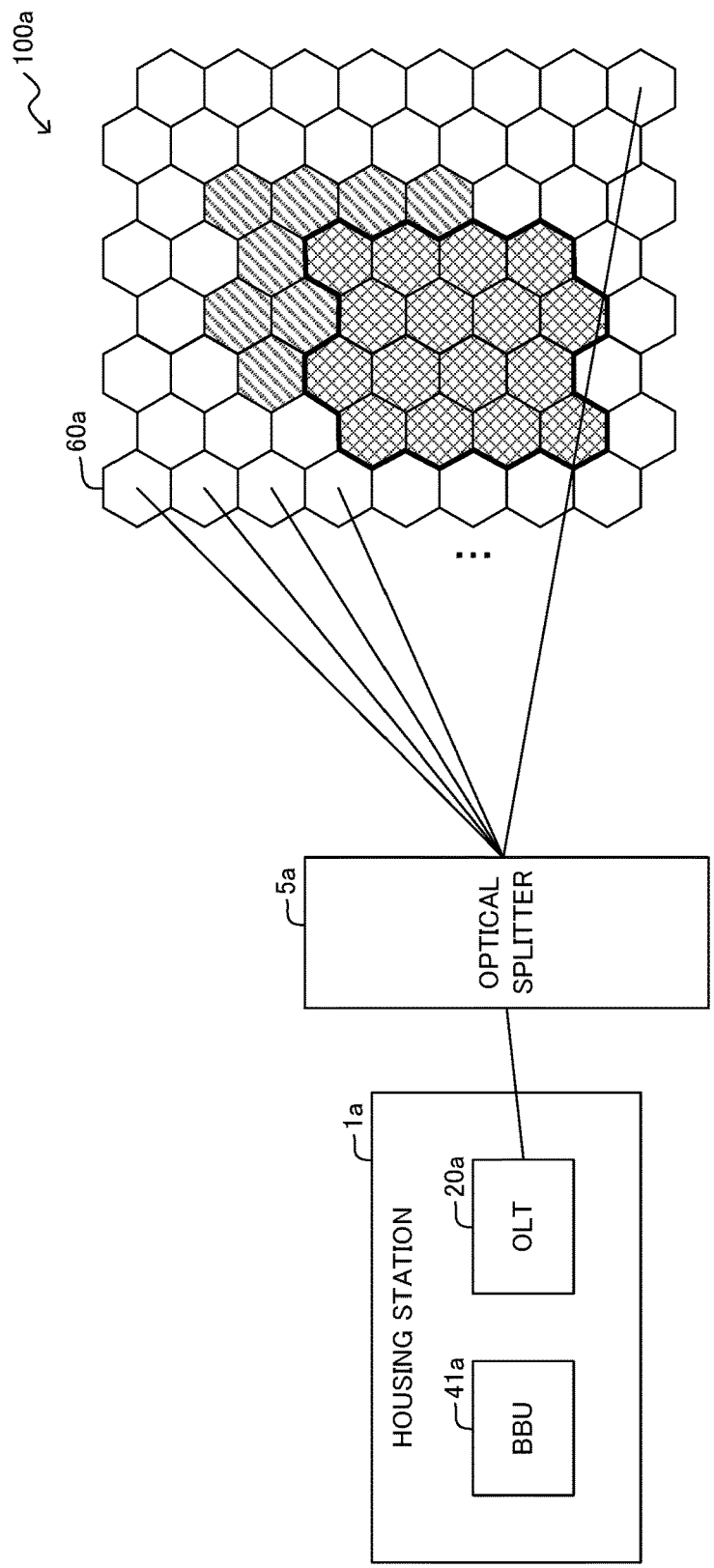
FIG. 2 is a diagram illustrating a second example of high-density cells of the optical communication system illustrated in FIG. 1.

FIG. 1 is a diagram illustrating a first example of high-density cells of an optical communication system 100a. FIG. 2 is a diagram illustrating a second example of high-density cells of the optical communication system 100a illustrated in FIG. 1.

As illustrated in FIGS. 1 and 2, as an example, the optical communication system 100a may be a 5 G(fifth-generation) fronthaul which uses a PON topology, and which includes a housing station 1a and an optical splitter 5a. Moreover, as an example, a plurality of cells 60a is deployed in the optical communication system 100a.

In FIGS. 1 and 2, reference numeral 60a is assigned to some of the plurality of cells deployed in the optical communication system 100a, and no reference numeral is assigned to the other cells.

As an example, an ONU 6a and a RRH 7a to be described later with reference to FIG. 3 and the like may be provided in the cell 60a. The cell 60a may be an area in which wireless communication is provided by the RRH 7a, and in other words, may be a wireless area provided by the RRH 7a.

The optical splitter 5a is an example of an optical device capable of splitting signal light input from an output port (not illustrated) of the housing station 1a. The signal light split by the optical splitter 5a may be distributed to ONUs 6a to which the plurality of cells 60a belong.

As an example, the housing station 1a transmits and receives signal light to and from the ONU 6a belonging to each cell 60a via the optical splitter 5a. For example, the housing station 1a may include a baseband unit (BBU) 41a, an OLT 20a, and a controller 10a (to be described later with reference to FIG. 3 and the like).

The BBU 41a is an example of a data processing unit and performs processing on the data transmitted and received between the BBU 41a and the RRH 7a as an example. The BBU 41a may be referred to as a centralized-baseband unit (C-BBU). As an example, in the BBU 41a, a conversion process between user data (for example, packets) exchanged via an interface (not illustrated) and data (for example, baseband signals) communicated with the RRH 7a may be performed. The user data may be exchanged with a core network of mobile communication via a backhaul network, for example. For example, the conversion process may include a process of performing encoding, modulation, and the like on the transmitted packets to acquire baseband signals and a process of performing demodulation, decoding, and the like on the received baseband signals to acquire packets. The BBU 41a and the RRH 7a may be regarded as an example of a wireless base station.

The OLT 20a is an example of an optical line termination device on the housing station 1a side, and as an example, transmits and receives signal light to and from the ONU 6a via an optical line (that is, an "optical transmission path"). An optical fiber is an example of the optical transmission path.

In the optical communication system 100a, inter-cell cooperative transmission may be performed to suppress interference in high-density cells. By performing inter-cell cooperative transmission using a CoMP communication method, it is possible to flexibly accommodate high-density cells.

When an event or a movement of people occurs due to a fluctuation over time in the traffic of the optical communication system 100a, a connection relation between the RRH 7a and the BBU 41a used in inter-cell cooperative transmission changes.

For example, as illustrated in FIG. 1, on a certain day, cells 60a depicted by hatched lines are high-density cells and inter-cell cooperative transmission is performed. On the other hand, as illustrated in FIG. 2, on the day after the day illustrated in FIG. 1, cells 60a depicted by a mesh pattern are high-density cells and inter-cell cooperative transmission is performed.

Figure 3:
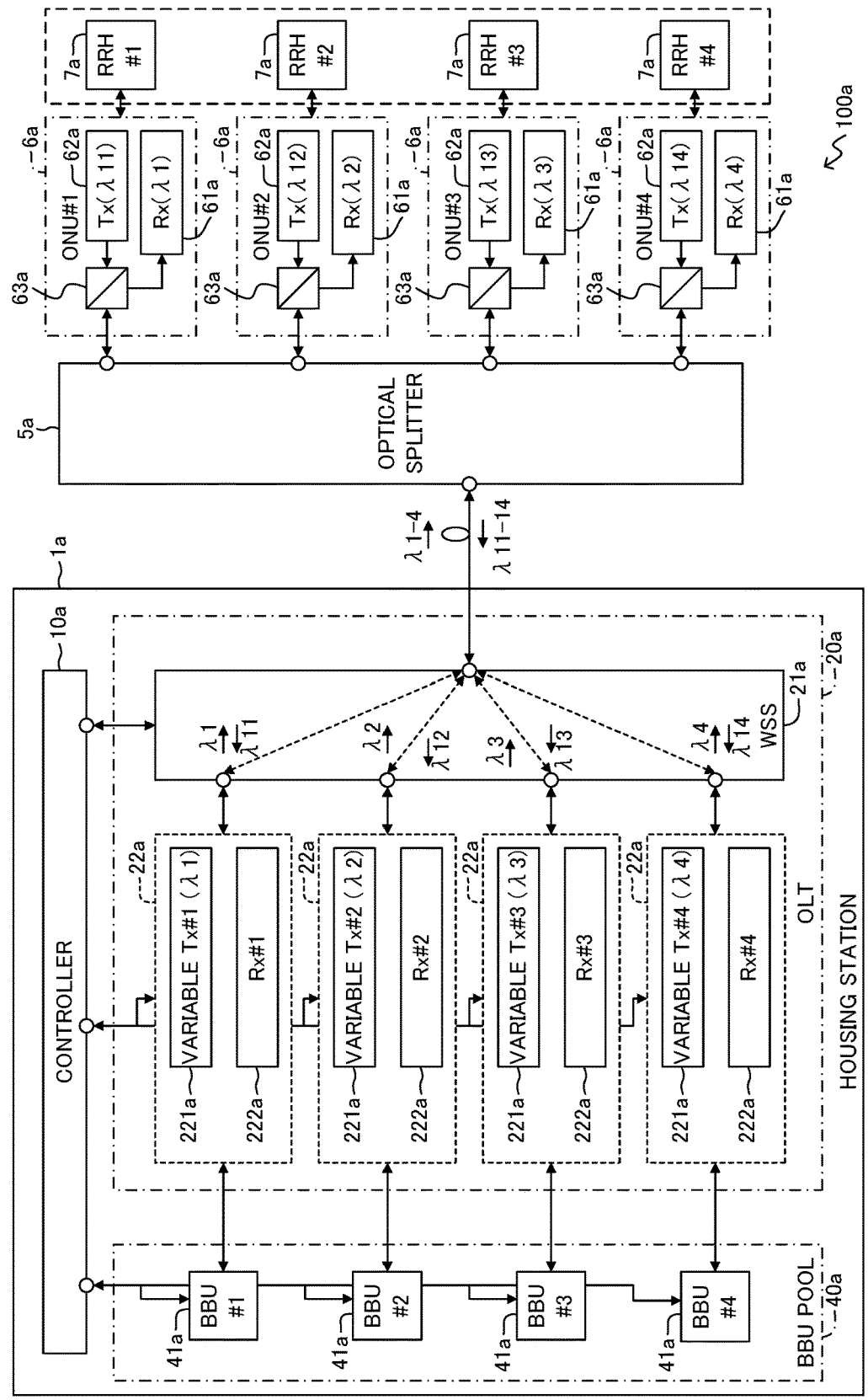
FIG. 3 is a block diagram illustrating a configuration example of an optical communication system.

FIG. 3 is a block diagram illustrating a configuration example of the optical communication system 100a.

The optical communication system 100*a* may have a configuration illustrated in FIG. 3 as an example so as to be able to flexibly change a connection relation between the RRH 7*a* and the BBU 41*a*.

As an example, the optical communication system 100*a* includes a housing station 1*a*, an optical splitter 5*a*, a plurality of (four in the example illustrated in FIG. 3) ONUs 6*a*, and a plurality of (four in the example illustrated in FIG. 3) RRHs 7*a*. The plurality of ONUs 6*a* may be referred to as ONU #1, ONU #2, ONU #3, or ONU #4. Moreover, the plurality of RRHs 7*a* may be referred to as RRH #1, RRH #2, RRH #3, or RRH #4.

The RRH 7*a* is an example of a wireless transmission point, and as an example, performs wireless communication with a wireless terminal (not illustrated) positioned in the cell 60*a* illustrated in FIGS. 1 and 2. The RRH 7*a* may be connected to the ONU 6*a* to convert the data acquired from the ONU 6*a* to wireless signals and transmit the wireless signals to the wireless terminal. Moreover, the RRH 7*a* may input data acquired by converting the wireless signals received from the wireless terminal to the ONU 6*a*.

In the example illustrated in FIG. 3, the RRHs #1 to #4 are connected to the ONUs #1 to #4, respectively. Moreover, the RRHs #1 to #4 may perform inter-cell cooperative transmission.

The ONU 6*a* is an example of an optical line termination device on the RRH 7*a* side, and as an example, includes an optical receiver 61*a* abbreviated as "Rx," an optical transmitter 62*a* abbreviated as "Tx," and an optical multiplexer/demultiplexer 63*a*.

The optical multiplexer/demultiplexer 63*a* demultiplexes signal light input from the optical splitter 5*a* via an optical transmission path from light in the optical transmission path to input the signal light to the optical receiver 61*a*, as an example. Moreover, the optical multiplexer/demultiplexer 63*a* may multiplex the signal light output from the optical transmitter 62*a* to light in the optical transmission path and input the light to the optical splitter 5*a*.

The optical receiver 61*a* may include an optical filter (not illustrated) as an example. The optical receiver 61*a* may receive a signal light of a predetermined wavelength (that is, a "fixed wavelength") having passed through the optical filter and transmit data acquired from the signal light to the RRH 7*a*.

In the example illustrated in FIG. 3, the optical receivers 61*a* of the ONUs #1 to #4 receive signal light of wavelengths λ1 to λ4, respectively.

The optical transmitter 62*a* may include a light source (not illustrated) as an example. The optical transmitter 62*a* performs a transmission process based on data input from the RRH 7*a* with respect to the light of a predetermined wavelength (that is, a "fixed wavelength") emitted from a light source to generate signal light and transmits the signal light to the optical multiplexer/demultiplexer 63*a*. The transmission process may include an optical modulation process.

In the example illustrated in FIG. 3, the optical transmitters 62*a* of the ONUs #1 to #4 transmit signal light of wavelengths λ11 to λ14, respectively.

The housing station 1*a* includes a controller 10*a*, an OLT 20*a*, and a BBU pool 40*a* as an example.

The BBU pool 40*a* includes a plurality of (four in the example illustrated in FIG. 3) BBUs 41*a* (may be also referred to as "BBU#1 to BBU#4"), as an example.

The OLT 20*a* includes a wavelength selective switch (WSS) 21*a* and a plurality of (four in the example illustrated in FIG. 3) optical transceiving modules 22*a*, as an example.

The WSS 21*a* is an example of an optical device capable of wavelength-multiplexing the signal light input from the plurality of optical transceiving modules 22*a* to output the signal light to the optical transmission path and outputting the signal light input from the optical splitter 5*a* to any one of the optical transceiving modules 22*a* for the respective wavelengths. The WSS 21*a* may include a port connected to the optical transceiving module 22*a* for each optical transceiving module 22*a*.

The optical transceiving module 22*a* includes an optical transmitter (variable Tx) 221*a* of which the transmission wavelength is variable and an optical receiver (Rx) 222*a* as an example.

Each of the optical transmitters 221*a* provided in the plurality of optical transceiving modules 22*a* may be referred to as an optical transmitter #1, an optical transmitter #2, an optical transmitter #3, or an optical transmitter #4. Moreover, each of the optical receivers 222*a* provided in the plurality of optical transceiving modules 22*a* may be referred to as an optical receiver #1, an optical receiver #2, an optical receiver #3, or an optical receiver #4.

The optical transmitter 221*a* may include a variable-wavelength light source (may be also referred to as a "tunable light source") (not illustrated), as an example. The optical transmitter 221*a* performs a transmission process based on the data input from the BBU 41*a* with respect to light of an arbitrary wavelength emitted by the variable-wavelength light source to generate signal light and transmits the signal light toward the ONU 6*a*. The wavelength of the signal light transmitted by the optical transmitter 221*a* may be determined based on a wavelength band that the optical receiver 61*a* of the connected ONU 6*a* can receive.

In the example illustrated in FIG. 3, the optical transmitters #1 to #4 transmit signal light of the wavelengths λ1 to λ4 to the optical receivers 61*a* of the ONUs #1 to #4, respectively.

The optical receiver 222*a* may receive signal light of an arbitrary wavelength according to the wavelength of signal light transmitted by the optical transmitter 62*a* of the connected ONU 6*a* and output the data acquired from the signal light to the BBU 41*a* as an example.

In the example illustrated in FIG. 3, the optical receivers #1 to #4 receive signal light of the wavelengths λ11 to λ14 from the optical transmitters 62*a* of the ONUs #1 to #4, respectively.

The controller 10*a* controls the operations of the WSS 21*a*, the optical transceiving modules 22*a*, and the BBUs 41*a* as an example.

The housing station 1*a* illustrated in FIG. 3 can perform centralized control of the optical communication system 100*a* by performing a cooperative operation with the BBU 41*a* and the OLT 20*a* and can control the change in the connection relation between the BBU 41*a* and the RRH 7*a*.

Figure 4:
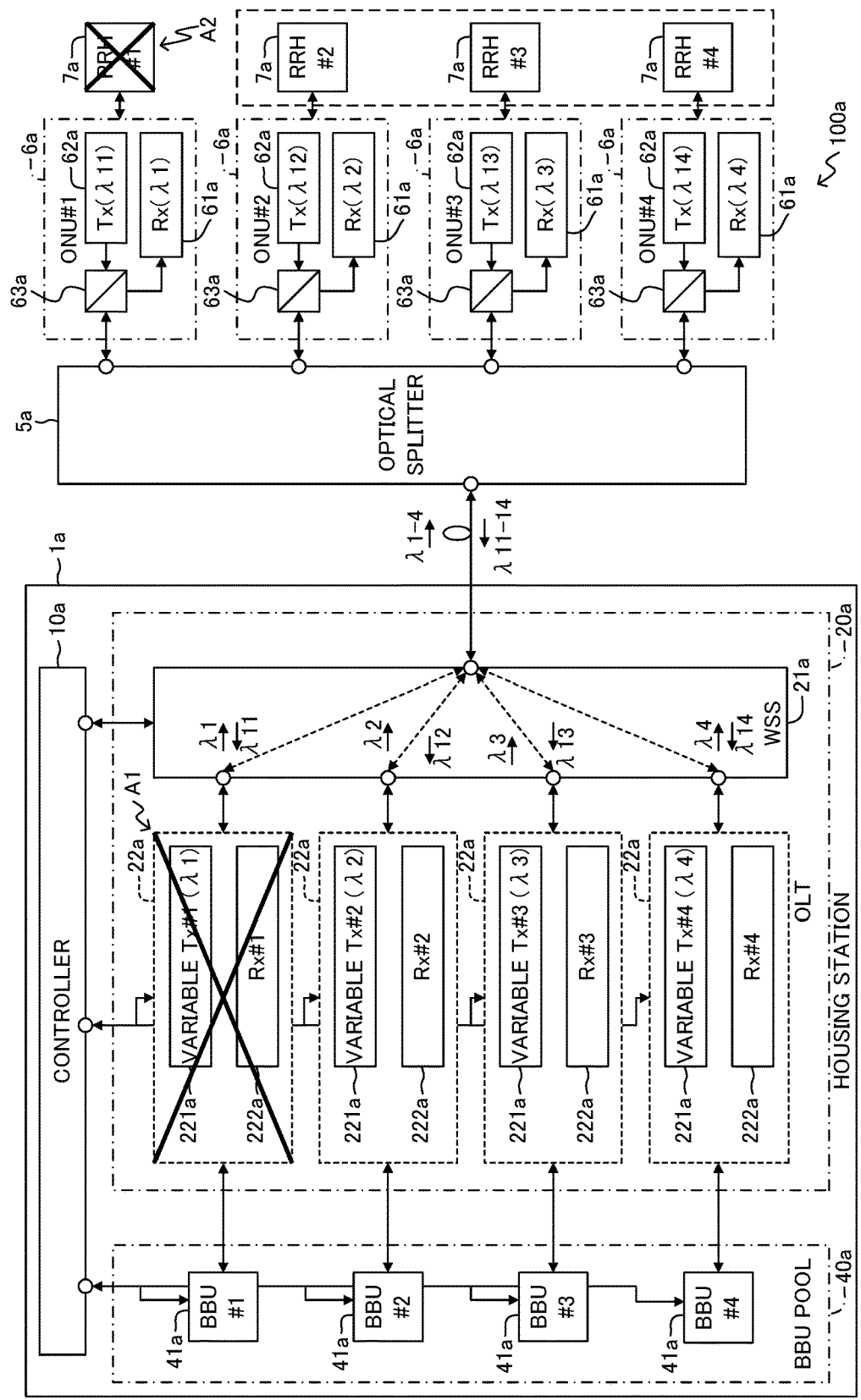
FIG. 4 is a diagram for describing faults occurring in a transceiving module of the optical communication system illustrated in FIG. 3.

FIG. 4 is a diagram for describing faults occurring in the optical transceiving module 22*a* of the optical communication system 100*a* illustrated in FIG. 3.

In the example illustrated in FIG. 4, a fault such as a trouble occurs in the optical transmitter #1 of the housing station 1*a* and the optical transceiving module 22*a* including the optical receiver #1 (see symbol A1). Due to this, the ONU #1 that performs communication with the faulty optical transceiving module 22*a* is not capable of transmitting and receiving signal light to and from the housing station 1*a*. Moreover, the RRH #1 connected to the ONU #1 is not capable of performing inter-cell cooperative transmission with the RRHs #2 to #4 (see symbol A2).

Figure 5:
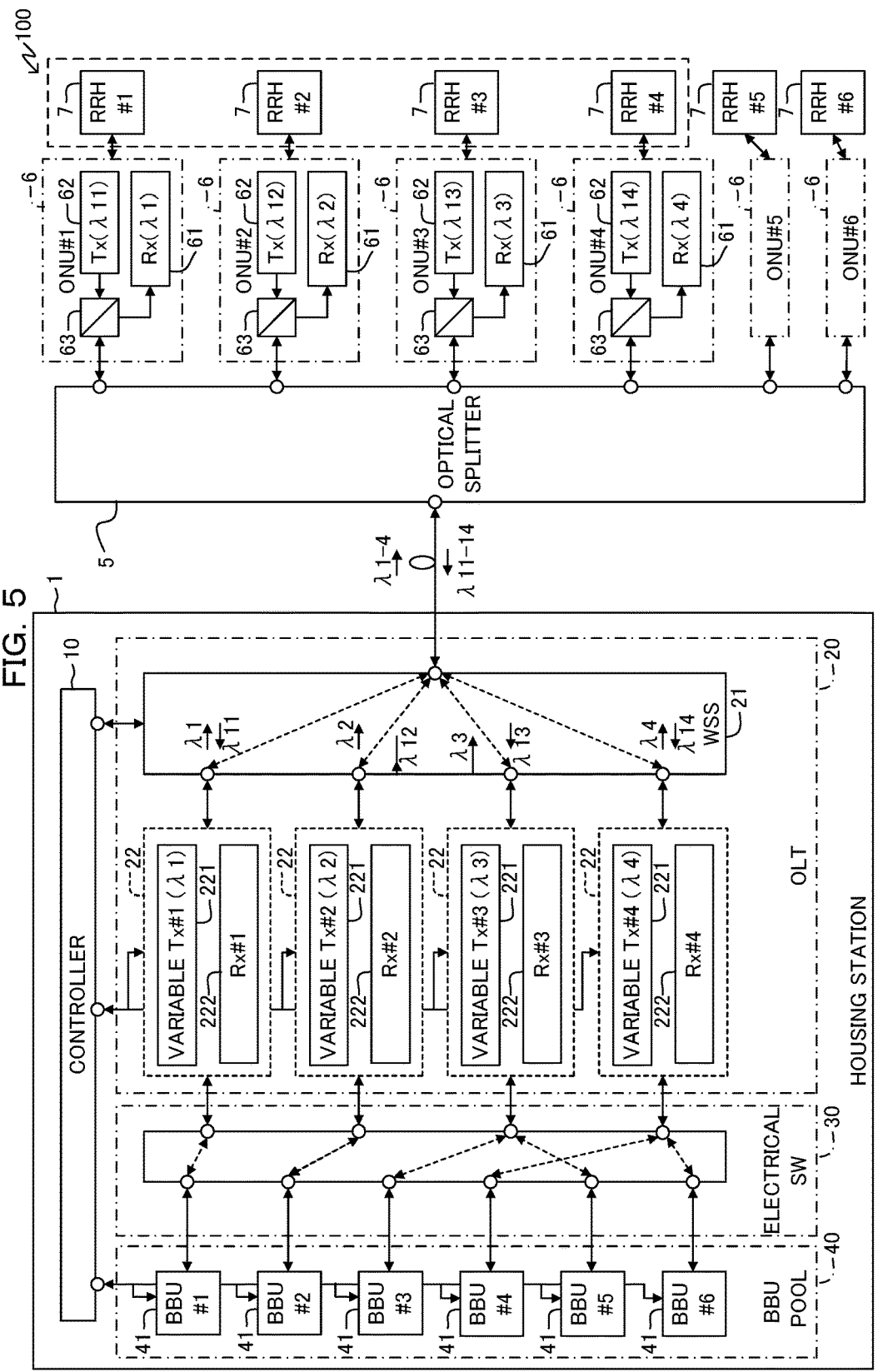
FIG. 5 is a block diagram illustrating a configuration example of an optical communication system according to an embodiment.

FIG. 5 is a block diagram illustrating a configuration example of an optical communication system 100 according to an embodiment.

The optical communication system 100 of the embodiment may have such a configuration as illustrated in FIG. 5 as an example so that RRHs 7 can perform inter-cell cooperative transmission continuously even when faults occur in the optical transceiving module 22.

The optical communication system 100 includes a housing station 1, an optical splitter 5, a plurality of (six in the example illustrated in FIG. 5) ONUs 6, and a plurality of (six in the example illustrated in FIG. 5) RRHs 7, as an example.

The plurality of ONUs 6 may be referred to as ONU #1, ONU #2, ONU #3, ONU #4, ONU #5, or ONU #6. Moreover, the plurality of RRHs 7 may be referred to as RRH #1, RRH #2, RRH #3, RRH #4, RRH #5, or RRH #6.

The communication between the housing station 1 and the respective ONUs 6 may be performed using an optical transmission path according to a wavelength division multiplexing (WDM)/time division multiplexing (TDM) PON method. The housing station 1 can accommodate the plurality of ONUs 6 using one wavelength. The WDM may include dense WDM (DWDM) having a high wavelength density.

Moreover, in the optical communication system 100, a common public radio interface (CPRI) over Ethernet (registered trademark) technique, for example, may be used in order to transmit a CPRI signal using PON.

The RRH 7 is an example of a wireless transmission point and as an example, performs wireless communication with a wireless terminal (not illustrated) positioned in a cell (not illustrated) deployed by the RRH 7. The RRH 7 may be connected to the ONU 6 to convert the data acquired from the ONU 6 to a wireless signal and transmit the wireless signal to the wireless terminal. Moreover, the RRH 7 may input the data acquired by converting the wireless signal received from the wireless terminal to the ONU 6. In FIG. 5, each of a plurality of combinations of the ONU 6 and the RRH 7 connected to each other is an example of a reception station.

In the example illustrated in FIG. 5, the RRHs #1 to #6 are connected to the ONUs #1 to #6, respectively. Moreover, the RRHs #1 to #4 may perform inter-cell cooperative transmission.

The ONU 6 is an example of an optical line termination device on the RRH 7 side, and as an example, includes an optical receiver (Rx) 61, an optical transmitter (Tx) 62, and an optical multiplexer/demultiplexer 63. The ONUs #5 and #6 have the same configuration as the ONUs #1 to #4, the illustration of the configuration thereof is omitted in FIG. 5.

The optical multiplexer/demultiplexer 63 demultiplexes signal light input from the optical splitter 5a via an optical transmission path from light in the optical transmission path to input the signal light to the optical receiver 61, as an example. Moreover, the optical multiplexer/demultiplexer 63 may multiplex the signal light output from the optical transmitter 62 to light in the optical transmission path and input the light to the optical splitter 5.

The optical transmitter 62 may include a light source (not illustrated) as an example. The optical transmitter 62 performs a transmission process based on data input from the RRH 7a with respect to the light of a predetermined wavelength emitted from a light source to generate signal light and transmits the signal light to the optical multiplexer/demultiplexer 63. The transmission process may include an optical modulation process. The optical transmitter 62 may be referred to as a "reception-station-side optical transmitter".

In the example illustrated in FIG. 5, the optical transmitters 62 of the ONUs #1 to #4 transmit signal light of wavelengths $\lambda 11$ to $\lambda 14$, respectively.

The optical receiver 61 may include a band pass filter (BPF) 611 (to be described later with reference to FIG. 6) having a predetermined transmission band as an example. The optical receiver 61 may receive signal light of a predetermined wavelength having passed through the BPF 611 and transmit the data acquired from the signal light to the RRH 7. The optical receiver 61 may be referred to as a "reception-station-side optical receiver".

In the example illustrated in FIG. 5, the optical receivers 61 of the ONUs #1 to #4 receive signal light of the wavelengths $\lambda 1$ to $\lambda 4$, respectively.

Figure 6:
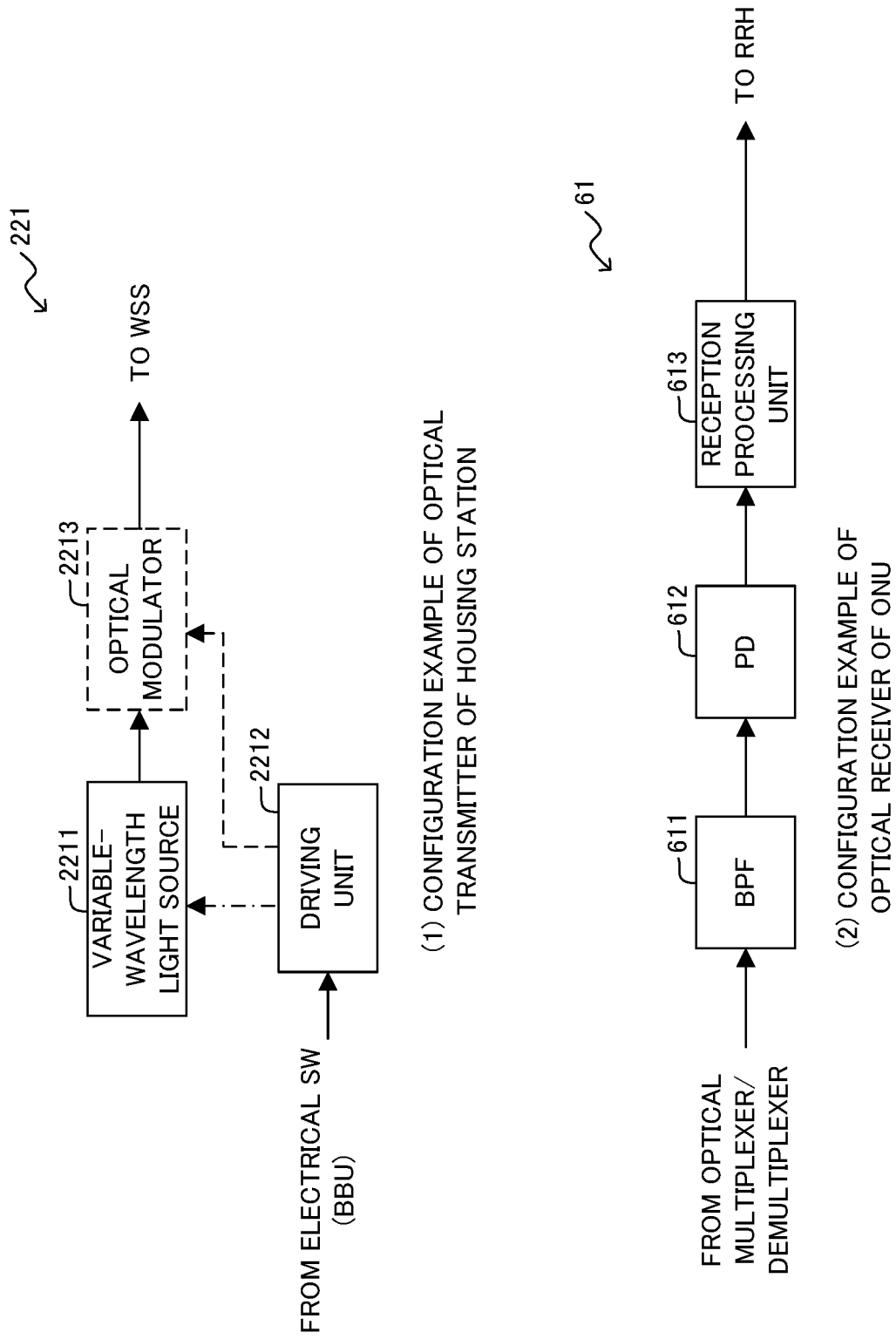
FIG. 6 is a block diagram illustrating configuration examples of a housing-station-side optical transmitter and an ONU-side optical receiver in the optical communication system illustrated in FIG. 5.

FIG. 6 is a block diagram illustrating a configuration example of the optical transmitter 221 on the housing station 1 side and the optical receiver 61 on the ONU 6 side of the optical communication system 100 illustrated in FIG. 5. A configuration example of the optical transmitter 221 illustrated in (1) of FIG. 6 will be described later.

As illustrated in (2) of FIG. 6, the optical receiver 61 includes the BPF 611, a photo detector (PD) 612, and a reception processing unit 613, as an example.

The BPF 611 is an example of first and second optical filters, and as an example, transmits signal light of a predetermined wavelength among the signal light input from the optical multiplexer/demultiplexer 63 and inputs the transmitted signal light to the PD 612. The wavelength of the signal light that the BPF 611 transmits will be described later with reference to FIG. 8.

The PD 612 generates an electrical signal corresponding to the power of the signal light having passed through the BPF 611 and inputs the generated electrical signal to the reception processing unit 613 as an example.

The reception processing unit 613 performs various processes such as demodulation on the electrical signal input from the PD 612 according to an optical modulation method of the optical signal performed in the optical transmitter 221 on the housing station 1 side as an example. Moreover, the reception processing unit 613 may input the data acquired by performing various processes to the RRH 7.

In other words, the reception processing unit 613 may function as an example of first and second receiving units that receive light having passed through the BPF 611.

Figure 7:
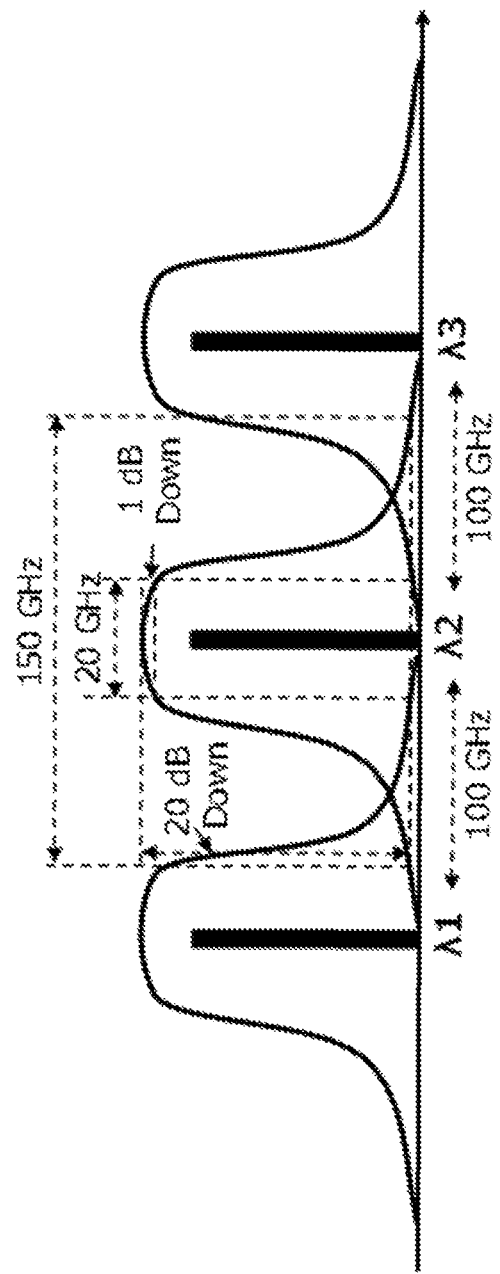
FIG. 7 is a diagram illustrating a transmission band of an optical filter of an ONU-side optical receiver of the optical communication system illustrated in FIG. 3.

FIG. 7 is a diagram illustrating a transmission band of an optical filter in the optical receiver 61a on the ONU 6a side of the optical communication system 100a illustrated in FIG. 3.

The wavelengths $\lambda 1$ to $\lambda 3$ of the signal light received by the optical receivers 61a of the ONUs #1 to #3, respectively, illustrated in FIG. 3 are set at an interval of 100 GHz as illustrated in FIG. 7. That is, the wavelengths $\lambda 1$ and $\lambda 2$ may have a difference of 100 GHz and the wavelengths $\lambda 2$ and $\lambda 3$ may have a difference of 100 GHz.

When a wavelength interval of the wavelength-multiplexed signal light is 100 GHz, the optical filter of the optical receiver 61a may have such transmission characteristics that a bandwidth in which transmittance decreases 1 dB about a central wavelength (for example, any one of $\lambda 1$ to $\lambda 4$) of the transmission band is approximately 20 GHz. Moreover, such transmission characteristics may be such that a bandwidth in which transmittance decreases 20 dB about the central wavelength (for example, any one of $\lambda 1$ to $\lambda 4$) of the transmission band is approximately 150 GHz.

When the wavelength interval of the wavelength-multiplexed signal light is 200 GHz doubled to 100 GHz, the optical filter of the optical receiver 61a may have the same transmission band as when the wavelength interval is 100 GHz. Alternatively, when the wavelength interval is 200 GHz, the transmission characteristics may be such that the bandwidth in which the transmittance decreases 1 dB is 40 GHz and the bandwidth in which the transmittance decreases 20 dB is 300 GHz, which are approximately twice the values when the wavelength interval is 100 GHz.

Figure 8:
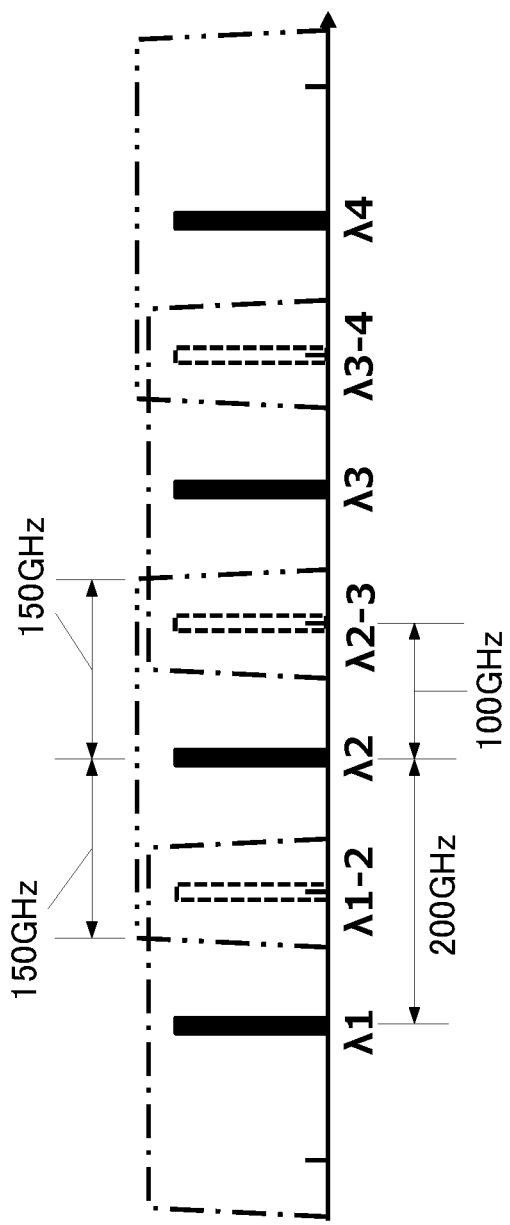
FIG. 8 is a diagram illustrating a transmission band of an optical filter of an ONU-side optical receiver of the optical communication system according to the embodiment illustrated in FIG. 6.

FIG. 8 is a diagram illustrating a transmission band of an optical filter (that is, the "BPF 611") of the optical receiver 61 on the ONU 6 side of the optical communication system 100 according to an embodiment illustrated in (2) of FIG. 6.

The wavelengths λ1 to λ4 of the signal light received by the optical receivers 61 of the ONUs #1 to #4, respectively, illustrated in FIG. 8 are set at an interval of 200 GHz as illustrated in FIG. 8. That is, the wavelengths λ1 and λ2 may have a difference of 200 GHz, the wavelengths λ2 and λ3 may have a difference of 200 GHz, and the wavelengths λ3 and λ4 may have a difference of 200 GHz.

The BPF 611 may have a transmission band of 300 GHz about a central wavelength (for example, any one of λ1 to λ4) of the transmission band (that is, a transmission band of 150 GHz on each of the short-wavelength side and the long-wavelength side). The transmission characteristics of the BPF 611 may be such that the bandwidth in which the transmittance decreases 1 dB is approximately 300 GHz. In this manner, the transmission band of each BPF 611 may have a wider transmission band than the optical filter of the optical receiver 61a illustrated in FIG. 3. Although FIG. 8 illustrates such transmission characteristics that the maximum powers of the signal light passing through the respective BPFs 611 are different for the sake of description, the maximum powers of the optical signals that the respective BPFs 611 transmit may be the same.

Here, since the wavelength interval of the wavelength-multiplexed signal light is 200 GHz, the transmission band 300 GHz of the BPF 611 may include a wavelength between the wavelength (for example, λ2) of the transmitting signal light and a wavelength (for example, λ1 and λ3) adjacent to the wavelength. As an example, as illustrated in FIG. 8, the transmission band may include a wavelength (for example, λ1-2, λ2-3, or λ3-4) having a difference of 100 GHz from the wavelength (for example, any one of λ1 to λ4) of the transmitting signal light.

In other words, the wavelengths λ1-2, λ2-3, and λ3-4 illustrated in FIG. 8 are commonly included in the transmission bands of two BPFs 611 of which the central wavelengths of the transmission bands are adjacent to each other. For example, λ1-2 is included in the transmission band of the BPF 611 that transmits the signal light of the wavelength λ1 and the transmission band of the BPF 611 that transmits the signal light of the wavelength λ2. Moreover, λ2-3 is included in the transmission band of the BPF 611 that transmits the signal light of the wavelength λ2 and the transmission band of the BPF 611 that transmits the signal light of the wavelength λ3. Furthermore, λ3-4 is included in the transmission band of the BPF 611 that transmits the signal light of the wavelength λ3 and the transmission band of the BPF 611 that transmits the signal light of the wavelength λ4. Since each of the wavelengths λ1-2, λ2-3, and λ3-4 is a wavelength that is shared by two ONUs 6 having the two BPFs 611 of which the central wavelengths of the transmission bands are adjacent to each other, these wavelengths may be referred to as shared wavelengths. Moreover, the "shared wavelength" may be referred to as a "standby wavelength".

In other words, each BPF 611 may transmit signal light of a wavelength positioned at a midpoint between the central wavelength of the transmission band of the subject BPF 611 and each of the central wavelengths of the BPFs 611 having adjacent transmission bands without transmitting signal light of the central wavelengths of the BPFs 611 having adjacent transmission bands. That is, a portion of the transmission band of each BPF 611 may overlap a portion of the transmission bands of adjacent BPFs 611. The central wavelength of the transmission band may be also referred to as a "wavelength grid" or a "wavelength channel".

Furthermore, in other words, one BPF 611 of the ONUs #1 to #4 may have a first transmission band including first and third wavelengths. Moreover, another BPF 611 of the ONUs #1 to #4 may have a second transmission band including second and third wavelengths.

In this way, the ONU 6 can continue receiving the signal light of the shared wavelength even when a fault occurs in the connected optical transmitter 221 and it is not possible to receive signal light of a wavelength which has been received from the connected optical transmitter 221.

Returning to FIG. 5, the optical splitter 5 is an example of an optical device capable of splitting signal light input from an output port (not illustrated) of the housing station 1 via an optical transmission path between the optical splitter 5 and the housing station 1. The signal light split by the optical splitter 5 may be distributed to the respective ONUs 6 via an optical transmission path between the optical splitter 5 and the respective ONUs 6. Moreover, the optical splitter 5 may output the signal light input from each ONU 6 via the optical transmission path toward the housing station 1. The signal light output from each ONU 6 to the housing station 1 may be transmitted according to a time division multiplexing method, for example. By transmitting the signal light according to the time division multiplexing method, it is possible to prevent collision with the signal light from a plurality of ONUs 6.

The housing station 1 is an example of a transmission station, and as an example, includes a controller 10, an OLT 20, an electrical SW (switch) 30, a BBU pool 40.

The OLT 20 is an example of an optical line termination device on the housing station 1 side and transmits and receives signal light to and from the ONU 6 via an optical line (that is, an "optical transmission path"), as an example. The OLT 20 includes a WSS 21 and a plurality of (four in the example illustrated in FIG. 5) optical transceiving modules 22 as an example.

The WSS 21 is an example of an optical device capable of wavelength-multiplexing the signal light input from the plurality of optical transceiving modules 22 to output the signal light to the optical transmission path and outputting the signal light input from the optical splitter 5 to any one of the optical transceiving modules 22 for the respective wavelengths. The WSS 21 may include a port connected to the optical transceiving module 22. The WSS 21 may be referred to simply as a "switch".

The optical transceiving module 22 includes an optical transmitter (variable Tx) 221 of which the transmission wavelength is variable and an optical receiver (Rx) 222 as an example.

Each of the optical transmitters 221 provided in the plurality of optical transceiving modules 22 may be referred to as an optical transmitter #1, an optical transmitter #2, an optical transmitter #3, or an optical transmitter #4. Moreover, each of the optical receivers 222a provided in the plurality of optical transceiving modules 22 may be referred to as an optical receiver #1, an optical receiver #2, an optical receiver #3, or an optical receiver #4.

The optical transmitter 221 is an example of a transmission-station-side optical transmitter, and as illustrated in (1) of FIG. 6, as an example, may include a variable-wavelength light source 2211, a driving unit 2212, and an optical modulator 2213. The variable-wavelength light source 2211 emits light of an arbitrary wavelength. The driving unit 2212 performs driving control based on the data input from the BBU 41 with respect to the light of the arbitrary wavelength emitted by the variable-wavelength light source 2211 to generate signal light. The generated signal light is transmitted toward the ONU 6. The wavelength of the signal light may be determined based on the wavelength band that the optical receiver 61 of the connected ONU 6 can receive.

In the driving control, the driving unit 2212 may perform direct modulation (see a one-dot-chain line in (1) of FIG. 6) to control the variable-wavelength light source 2211. In this case, the optical modulator 2213 is unnecessary. Alternatively, the driving unit 2212 may perform external modulation (see a broken line in (1) of FIG. 6) to control the optical modulator 2213 that modulates light from the variable-wavelength light source 2211. A Mach-Zehnder optical modulator is an example of the optical modulator 2213.

For example, the optical transmitter 221 may be able to transmit signal light of a shared wavelength which is a wavelength at a midpoint between the central wavelength of a wavelength band that the optical receiver 61 of the communicating ONU 6 can receive and a transmission wavelength of the optical transmitter 221 that transmits an adjacent wavelength in addition to the signal light of the central wavelength.

In the example illustrated in FIG. 5, the optical transmitters #1 to #4 can transmit signal light of the wavelengths λ1 to λ4, respectively. Moreover, the optical transmitters #1 and #2 may be able to transmit the shared wavelength λ1-2, the optical transmitters #2 and #3 may be able to transmit the shared wavelength λ2-3, and the optical transmitters #3 and #4 may be able to transmit the shared wavelength λ3-4.

In other words, the optical transmitter 221 can transmit light of a first wavelength and light of a third wavelength between the first wavelength and a second wavelength.

In this way, even when a fault occurs in the certain optical transmitter 221, another optical transmitter 221 that transmits signal light of a wavelength adjacent to the transmission wavelength of the faulty optical transmitter 221 can continue transmitting signal light to the ONU 6 connected to the faulty optical transmitter 221.

For example, when the RRHs #1 to #4 perform inter-cell cooperative transmission, the RRH #1 can receive data associated with cooperative transmission from the optical transmitter #2 even when it is not possible to receive data associated with the cooperative transmission from the optical transmitter #1 due to faults. Therefore, even when a fault occurs in the optical transmitter #1, since the RRH #1 (and the RRH #2) can receive data associated with cooperative transmission from the optical transmitter #2, the RRH #1 can perform inter-cell cooperative transmission continuously. In other words, it is possible to improve the availability of the optical transmitter 221 with a simple configuration.

In the inter-cell cooperative transmission, examples of a method of using the same data as the data associated with the cooperative transmission between a plurality of RRHs 7 include a joint transmission (JT) method and a dynamic point selection (DPS) method. In the optical communication system 100 according to the embodiment, inter-cell cooperative transmission according to the JT or DPS method can be performed by at least two cells including the RRHs #1 and #2, for example.

Moreover, inter-cell cooperative transmission according to another method (for example, a coordinated scheduling/coordinated beam forming (CS/CB) method) can be performed between the cells of the RRHs #1 and #2 and at least one other cells (for example, the RRH #3).

The optical receiver 222 is an example of a transmission-station-side optical receiver, and as an example, may receive signal light of an arbitrary wavelength according to the wavelength of the signal light transmitted by the optical transmitter 62 of the communicating ONU 6 and output the data acquired from the signal light to the BBU 41. When the optical transmitter 62 of the communication destination ONU 6 of the optical receiver 222 is changed, the wavelength of the signal light that the optical receiver 222 receives has to be changed. Moreover, when the optical transmitter 62 of the communication destination ONU 6 of the optical receiver 222 is added, the wavelength of the signal light that the optical receiver 222 receives may be added.

In this way, even when a fault occurs in another optical receiver 222, the optical receiver 222 can receive signal light transmitted from the ONU 6 communicating with the faulty optical receiver 222.

In the example illustrated in FIG. 5, the optical receivers #1 to #4 receive the signal light of the wavelengths λ11 to λ14 from the optical transmitters 62 of the ONUs #1 to #4, respectively.

The BBU pool 40 includes a plurality of (six in the example illustrated in FIG. 5) BBUs 41 (that is, "BBUs #1 to #6") as an example.

The BBU 41 is an example of a data processing unit, and as an example, performs processing on the data transmitted and received to and from the RRH 7. The BBU 41 may be referred to as a C-BBU. As an example, in the BBU 41, a conversion process between the user data (for example, packets) exchanged via an interface (not illustrated) and the data (for example, baseband signals) communicated with the RRH 7 may be performed. For example, the conversion process may include a process of performing encoding, modulation, and the like on the transmitted packets to acquire baseband signals and a process of performing demodulation, decoding, and the like on the received baseband signals to acquire packets. The BBU 41 and the RRH 7 may be regarded as an example of a wireless base station.

The electrical SW 30 is an example of a switch capable of arbitrarily switching the optical transceiving module 22 and the BBU 41 to be connected.

In the example illustrated in FIG. 5, the electrical SW 30 connects the BBU #1 and the optical transceiving module 22 that includes the optical transmitter #1 and the optical receiver #1. Moreover, the electrical SW 30 connects the BBU #2 and the optical transceiving module 22 that includes the optical transmitter #2 and the optical receiver #2. Furthermore, the electrical SW 30 connects the BBUs #3 and #5 and the optical transceiving module 22 that includes the optical transmitter #3 and the optical receiver #3. Moreover, the electrical SW 30 connects the BBUs #4 and #6 and the optical transceiving module 22 that includes the optical transmitter #4 and the optical receiver #4. The connection relation of the optical transceiving module 22 and the BBU 41 illustrated in FIG. 5 is an example only. A connection state between the optical transceiving module 22 and the BBU 41 by the electrical SW 30 may be changed appropriately according to a change or the like in the relation between the BBU 41 and the communication destination RRH 7 of the BBU 41.

The controller 10 controls the operations of the WSS 21, the optical transceiving modules 22, the electrical SW 30, and the BBUs 41 as an example.

Figure 9:
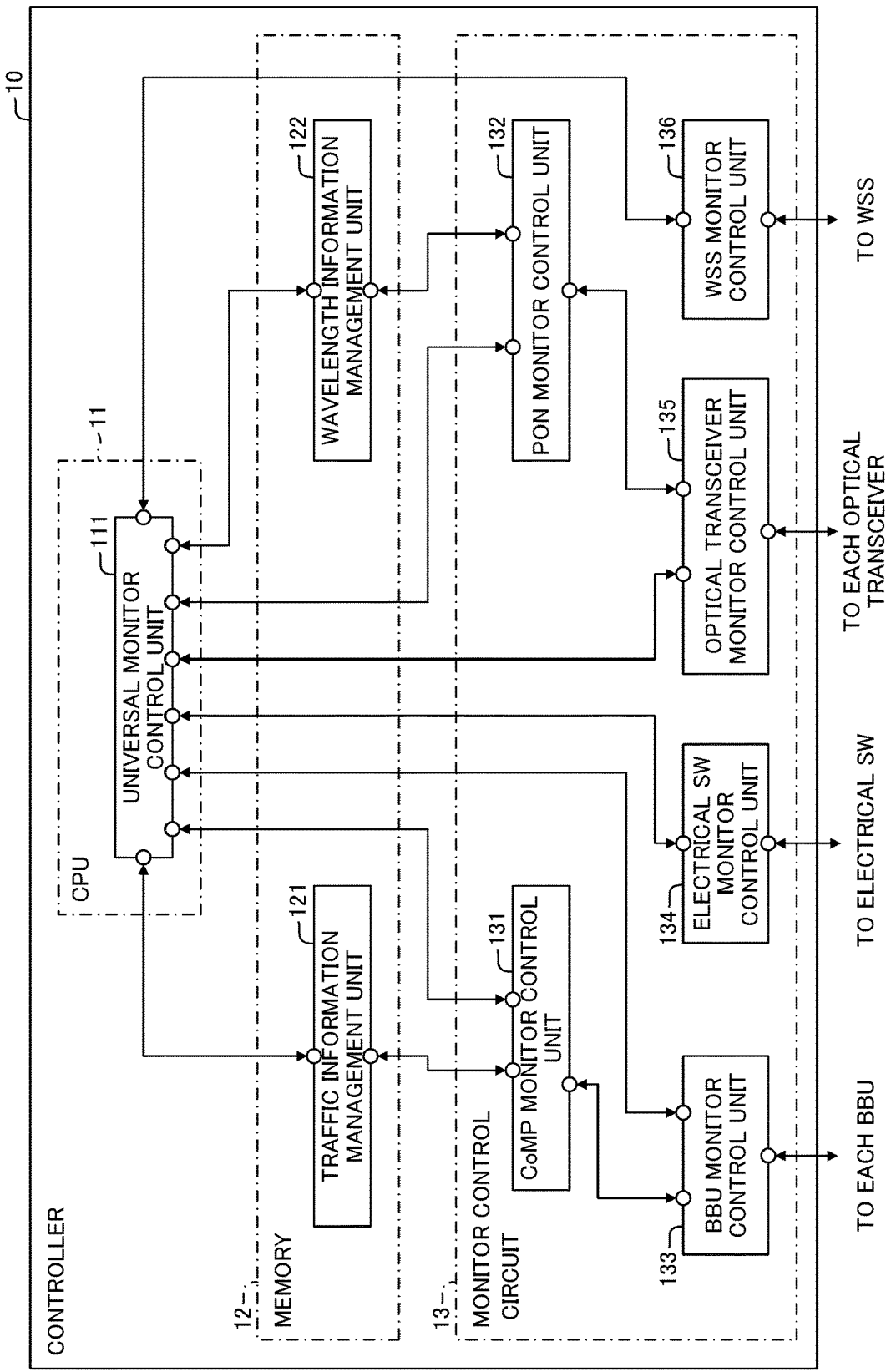
FIG. 9 is a block diagram illustrating a functional configuration example of a controller of the optical communication system illustrated in FIG. 5.

FIG. 9 is a block diagram illustrating a functional configuration example of the controller 10 of the optical communication system 100 illustrated in FIG. 5.

As illustrated in FIG. 9, the controller 10 includes a central processing unit (CPU) 11, a memory 12, and a monitor control circuit 13 as an example.

The CPU 11 includes a universal monitor control unit 111. The universal monitor control unit 111 monitors and controls the housing station 1 with the aid of the monitor control circuit 13 based on the information transmitted from the monitor control circuit 13 and the information stored in the memory 12.

As an example, the monitor control circuit 13 includes a CoMP monitor control unit 131, a PON monitor control unit 132, a BBU monitor control unit 133, an electrical SW monitor control unit 134, an optical transceiver monitor control unit 135, and a WSS monitor control unit 136.

The CoMP monitor control unit 131 monitors and controls inter-cell cooperative transmission based on the CoMP communication method between the BBU 41 and the RRH 7 as an example.

The CoMP monitor control unit 131 may recognize that the communication destination optical transceiving module 22 of the RRH 7 that communicates with the faulty optical transceiving module 22 is changed according to the notification from the universal monitor control unit 111 of the CPU 11.

The PON monitor control unit 132 monitors and controls PON-based communication between the OLT 20 and the ONU 6 as an example.

The PON monitor control unit 132 may perform a discovery process on the ONU 6 of which the communication destination optical transceiving module 22 is changed and may establish logical connection between the ONU 6 and the optical transceiving module 22 which is a changed communication destination.

Moreover, the PON monitor control unit 132 may perform control on the signal light transmitted from the ONU 6 to the housing station 1 using a PON-based time division multiplexing technique to prevent collision of signal light transmitted from different ONUs 6 to the same optical transceiving module 22.

The BBU monitor control unit 133 monitors and controls the BBUs 41 as an example.

The electrical SW monitor control unit 134 monitors and controls the electrical SW 30. The electrical SW monitor control unit 134 may change the path of the electrical SW 30 so that a connection destination of the BBU 41 connected to the faulty optical transceiving module 22 is changed to the optical transceiving module 22 that transmits light of a wavelength adjacent to the wavelength of the light transmitted by the faulty optical transceiving module 22.

The optical transceiver monitor control unit 135 is an example of a wavelength controller, and as an example, monitors and controls the optical transceiving module 22.

The optical transceiver monitor control unit 135 may detect a fault such as a trouble occurring in any one of the optical transceiving modules 22 and may notify the universal monitor control unit 111 of the CPU 11 of the occurrence of the fault.

The optical transceiver monitor control unit 135 may control the optical transceiving module 22 that transmits signal light of a wavelength adjacent to the wavelength of the signal light transmitted by the faulty optical transceiving module 22 according to the setting made by the universal monitor control unit 111. For example, the optical transceiver monitor control unit 135 may perform control to change the wavelength of the signal light transmitted by the optical transceiving module 22 selected by the universal monitor control unit 111 to a shared wavelength. The control of the transmission wavelength of the optical transceiving module 22 by the optical transceiver monitor control unit 135 may be performed by controlling the wavelength of light output by the variable-wavelength light source 2211.

In other words, the optical transceiver monitor control unit 135 may perform control to change a state in which the light of a first wavelength is transmitted by the optical transmitter 221 to a state in which the light of a third wavelength is transmitted.

Here, the third wavelength may be a wavelength between the first wavelength and the second wavelength. The first wavelength may be a wavelength of light transmitted by the optical transmitter 221. The second wavelength may be a wavelength adjacent to the first wavelength of the light transmitted by the optical transmitter 221. The difference between the first and third wavelengths may be the same as the difference between the third and second wavelengths. That is, the third wavelength may be an intermediate wavelength between the first and second wavelengths.

In this way, when a fault occurs in a certain optical transmitter 221, it is possible to allow another optical transmitter 221 to transmit signal light of a shared wavelength and to continue communication between the housing station 1 and the ONU 6. Therefore, in the inter-cell cooperative transmission of the BBU 41 and the RRH 7, according to an optical access network system which can be reconfigured according to a change in the connection relation between the BBU 41 and the RRH 7, it is possible to provide a redundancy method even when a standby optical transmitter 221 is not provided in the OLT 20.

The WSS monitor control unit 136 is an example of a switch controller, and as an example, monitors and controls the WSS 21.

The WSS monitor control unit 136 may control the wavelength of signal light that passes through the WSS 21 according to the setting made by the universal monitor control unit 111. For example, the WSS monitor control unit 136 may control the WSS 21 so that the transmission band of the port of the WSS 21 connected to the optical transceiving module 22 controlled to transmit light of a shared wavelength includes the shared wavelength. Moreover, the WSS monitor control unit 136 may control the WSS 21 so that the transmission band of the port of the WSS 21 connected to the optical transceiving module 22 that transmits light of a shared wavelength includes the wavelength of the signal light that the faulty optical transceiving module 22 receives.

In other words, the WSS monitor control unit 136 may perform control to cause the WSS 21 to allow light of the first and third wavelengths transmitted from the optical transmitter 221 to pass therethrough. Moreover, when the optical transceiver monitor control unit 135 performs control to change the transmission state of the optical transmitter 221, the WSS monitor control unit 136 may perform control to cause the WSS 21 to limit the wavelength of light allowed to pass through the optical transmitter 221 to the third wavelength. That is, the WSS monitor control unit 136 may perform control to cause the WSS 21 to suppress light of a second wavelength from passing through the optical transmitter 221.

Here, the third wavelength may be a wavelength between the first and second wavelengths. The first wavelength may be the wavelength of light that the optical transmitter 221 transmits. The second wavelength may be a wavelength adjacent to the first wavelength of light that the optical transmitter 221 transmits. The difference between the first and third wavelengths may be the same as the difference between the third and second wavelengths. That is, the third wavelength may be an intermediate wavelength between the first and second wavelengths.

In this way, even when the connection destination of the ONU 6 connected to a faulty optical transmitter 221 is changed, it is possible to continue communication between the housing station 1 and the ONU 6 using a downlink shared wavelength without stopping an active service operating with a downlink signal wavelength. Here, the "downlink" may mean a "direction from the housing station 1 toward the ONU 6".

The memory 12 is a storage device including at least one of a read only memory (ROM) and a random access memory (RAM) as an example. A program such as a basic input/output system (BIOS) or the like may be written to the ROM of the memory 12. A software program of the memory 12 may be appropriately read and executed by the CPU 11 and the monitor control circuit 13. Moreover, the RAM of the memory 12 may be used as a primary recording memory or a working memory.

At least a portion of a storage area of the memory 12 may be used as the traffic information management unit 121 and the wavelength information management unit 122.

The traffic information management unit 121 stores traffic information to be described later with reference to FIG. 17 as an example. Moreover, the wavelength information management unit 122 stores wavelength information to be described later with reference to FIG. 18 as an example.

The CPU 11 is a processing device that performs various control and operations and realizes various functions by executing an operating system (OS) and a program stored in the memory 12. That is, as illustrated in FIG. 9, the CPU 11 may function as the universal monitor control unit 111.

A program for realizing the function of the universal monitor control unit 111 may be provided in a form of being recorded on a computer-readable recording medium. Moreover, a computer (the CPU 11 in the present embodiment) may read the program from the recording medium via a reading device (not illustrated), transmit the program to an internal recording device or an external recording device, and use the program. Moreover, the program may be recorded on a storage device (recording medium) such as, for example, a magnetic disc, an optical disc, a magneto-optic disc, or a flash memory and be provided from the storage device to the computer via a communication path.

The computer-readable recording medium may be a flexible disk, a CD, a DVD, a blu-ray disc, a magnetic disk, an optical disc, a magneto-optic disc, a flash memory, and the like, for example. The CD may be a CD-ROM, a CD-R, a CD-RW, and the like. Moreover, the DVD may be a DVD-ROM, a DVD-RAM, a DVD-R, a DVD+R, a DVD-RW, a DVD+RW, a HD DVD, and the like.

When the function of the universal monitor control unit 111 is to be realized, the program stored in the internal storage device (the memory 12 in the present embodiment) may be executed by the computer (the CPU 11 in the present embodiment). Moreover, the program recorded on the recording medium may be read and executed by the computer.

The universal monitor control unit 111 may specify the RRH 7 connected to the ONU 6 communicating with the faulty optical transceiving module 22 based on the notification from the optical transceiver monitor control unit 135. Moreover, the universal monitor control unit 111 may notify the CoMP monitor control unit 131 of the information on the specified RRH 7.

The universal monitor control unit 111 may select the optical transceiving module 22 that transmits light of a wavelength adjacent to the wavelength of the signal light transmitted by the faulty optical transceiving module 22 as the optical transceiving module 22 that transmits the signal light of the shared wavelength. The universal monitor control unit 111 may cause the optical transceiver monitor control unit 135 to perform control to change the wavelength of the signal light transmitted by the selected optical transceiving module 22 to the shared wavelength.

The universal monitor control unit 111 may cause the WSS monitor control unit 136 to perform control so that the transmission band of the port of the WSS 21 connected to the optical transceiving module 22 that transmits light of the shared wavelength includes the shared wavelength. Moreover, the universal monitor control unit 111 may cause the WSS monitor control unit 136 to perform control so that the transmission band of the port of the WSS 21 connected to the optical transceiving module 22 that transmits light of a shared wavelength includes the wavelength of the signal light that the faulty optical transceiving module 22 receives.

[A-2] Operation Example

A fault handling operation of the optical communication system 100 according to the embodiment having the above-described configuration will be described according to the flowchart (see processes P1 to P7) illustrated in FIG. 12 with reference to FIGS. 10 and 11.

When the optical transmitter #1 and the optical transceiving module 22 including the optical receiver #1 fail (see symbol B1 in FIG. 10), the optical transceiver monitor control unit 135 may detect a fault in the optical transmitter #1 and the optical transceiving module 22 including the optical receiver #1 (see process P1). Moreover, the optical transceiver monitor control unit 135 may notify the universal monitor control unit 111 of the occurrence of the fault.

Figure 12:
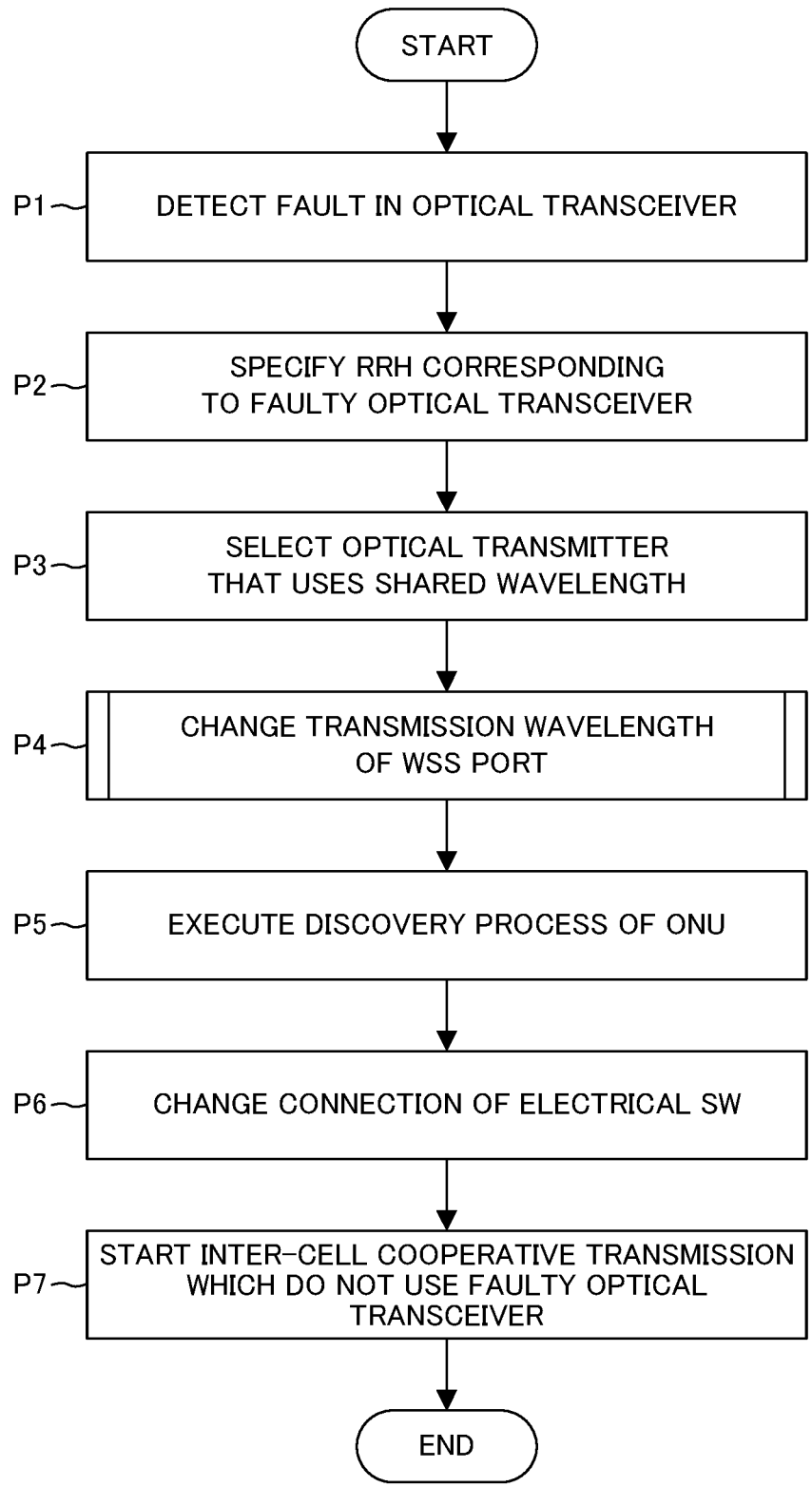
FIG. 12 is a flowchart for describing a fault handling operation in the optical communication system according to the embodiment.

The universal monitor control unit 111 may specify the RRH #1 corresponding to the faulty optical transceiving module 22 (see process P2 in FIG. 12). In other words, the universal monitor control unit 111 may specify the RRH #1 connected to the faulty optical transmitter #1 and the ONU #1 communicating with the optical receiver #1 and notify the CoMP monitor control unit 131 of the information on the RRH #1. In this way, the universal monitor control unit 111 and the CoMP monitor control unit 131 may recognize the inter-cell cooperative transmission by the RRH #1 is not valid (see symbol B2 in FIG. 10).

The universal monitor control unit 111 may select the optical transmitter #2 as the optical transmitter 221 that uses the shared wavelength λ1-2 (see symbol C1 in FIG. 11 and process P3 in FIG. 12). In other words, the universal monitor control unit 111 may select the optical transmitter #2 that transmits signal light of the wavelength λ2 adjacent to the wavelength λ1 of the signal light transmitted by the faulty optical transmitter #1 as the optical transmitter 221 that transmits light of the shared wavelength λ1-2.

The universal monitor control unit 111 may cause the WSS monitor control unit 136 to perform control to change the transmission wavelength of the port of the WSS 21 (see process P4 in FIG. 12). The details of the process P4 will be described later with reference to the flowchart illustrated in FIG. 13.

The PON monitor control unit 132 may execute a discovery process of the ONU #1 that communicates with the faulty optical transmitter #1 and the faulty optical receiver #1 (see process P5 in FIG. 12). In this way, the connection between the ONU #1 and the optical transmitter #2 and the optical receiver #2 that use the shared wavelength $\lambda$1-2 may be established.

The electrical SW monitor control unit 134 may change the connection destination of the BBU #1 connected to the faulty optical transmitter #1 and the faulty optical receiver #1 to the optical transmitter #2 and the optical receiver #2 that use the shared wavelength $\lambda$1-2 (see process P6 in FIG. 12).

Moreover, the RRH #1 may start inter-cell cooperative transmission which does not use the faulty optical transmitter #1 and the faulty optical receiver #1 (see process P7 in FIG. 12) and end the process. In this way, the optical receiver 61 of the ONU #1 and the optical receiver 61 of the ONU #2 receive the signal light of the wavelength $\lambda$1-2 (see symbols C2 and C3 in FIG. 11). The RRHs #2 to #4 may perform inter-cell cooperative transmission excluding the RRH #1 during the processes P1 to P7 in FIG. 12 and may perform inter-cell cooperative transmission together with the RRH #1 when the process P7 is completed.

Next, the details of the process P4 illustrated in FIG. 12 will be described according to the flowchart (processes P41 to P44) illustrated in FIG. 13 with reference to FIG. 11.

Figure 13:
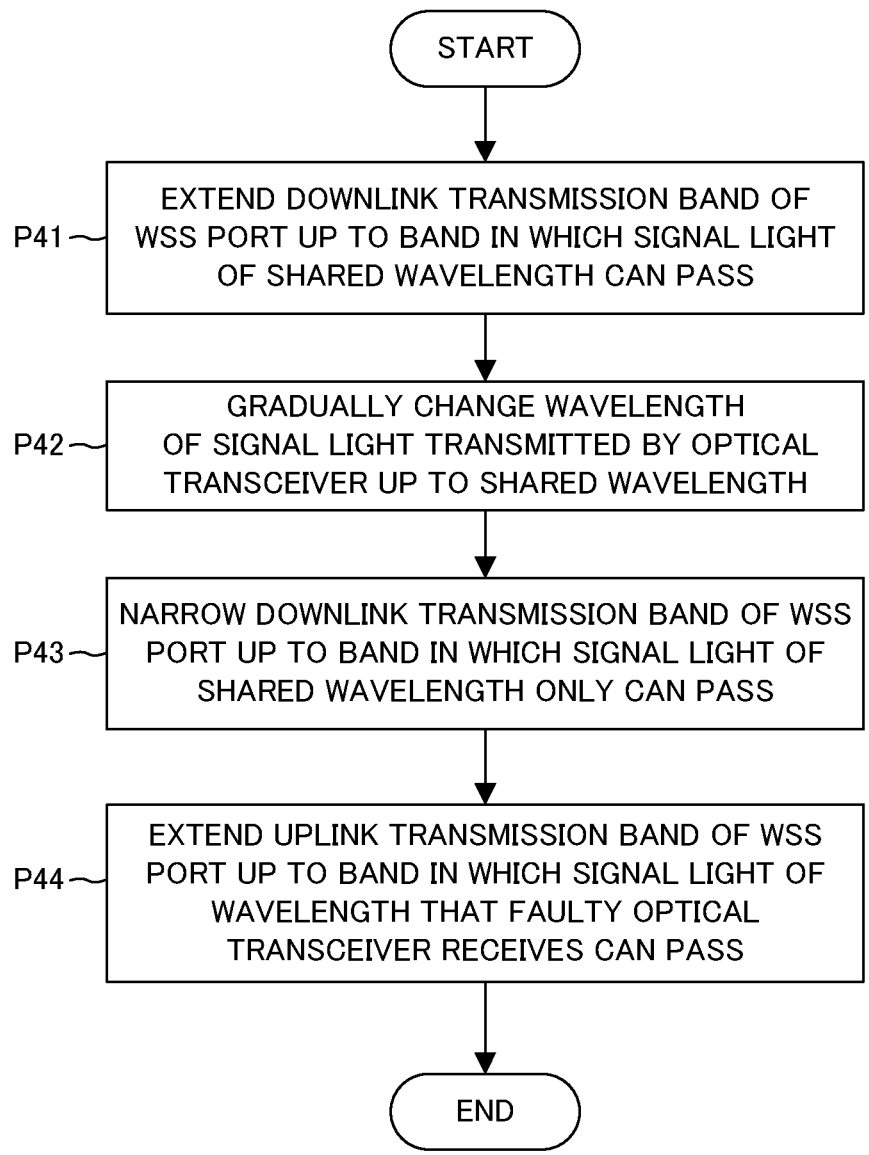
FIG. 13 is a flowchart for describing the details of a process P4 illustrated in FIG. 12.

The WSS monitor control unit 136 may broaden the downlink transmission band of the port of the WSS 21 connected to the optical transceiving module 22 including the optical transmitter #2 and the optical receiver #2 up to a band in which the shared wavelength $\lambda$1-2 can pass (see the process P41 in FIG. 13). In other words, the WSS monitor control unit 136 may broaden the downlink transmission band of the port of the WSS 21 from a band including the active wavelength $\lambda$2 to a band including the shared wavelength $\lambda$1-2 and the active wavelength $\lambda$2. The "downlink transmission band" may mean a "transmission band from the housing station 1 toward the ONU 6".

The optical transceiver monitor control unit 135 may gradually change the wavelength $\lambda$2 of the signal light transmitted by the optical transmitter #2 up to the shared wavelength $\lambda$1-2 (see the process P42 in FIG. 13).

The WSS monitor control unit 136 may narrow the downlink transmission band of the port of the WSS 21 connected to the optical transceiving module 22 including the optical transmitter #2 and the optical receiver #2 up to a band in which the signal light of the shared wavelength $\lambda$1-2 only can pass (see the process P43 in FIG. 13). In other words, the WSS monitor control unit 136 may narrow the downlink transmission band of the port of the WSS 21 from a band including the shared wavelength $\lambda$1-2 and the wavelength $\lambda$2 to a band including the shared wavelength $\lambda$1-2.

The WSS monitor control unit 136 may broaden the uplink transmission band of the port of the WSS 21 connected to the optical transceiving module 22 including the optical transmitter #2 and the optical receiver #2 up to a band in which the signal light of the wavelength $\lambda$11 received by the faulty optical receiver #1 can pass (see the process P44 in FIG. 13). In other words, the WSS monitor control unit 136 may broaden the uplink transmission band of the port of the WSS 21 from a band including the wavelength $\lambda$12 to a band including the wavelengths $\lambda$11 and $\lambda$12. Moreover, the process may end. The "uplink transmission band" may mean a "transmission band from the ONU 6 toward the housing station 1".

[B] Modification

Figure 10:
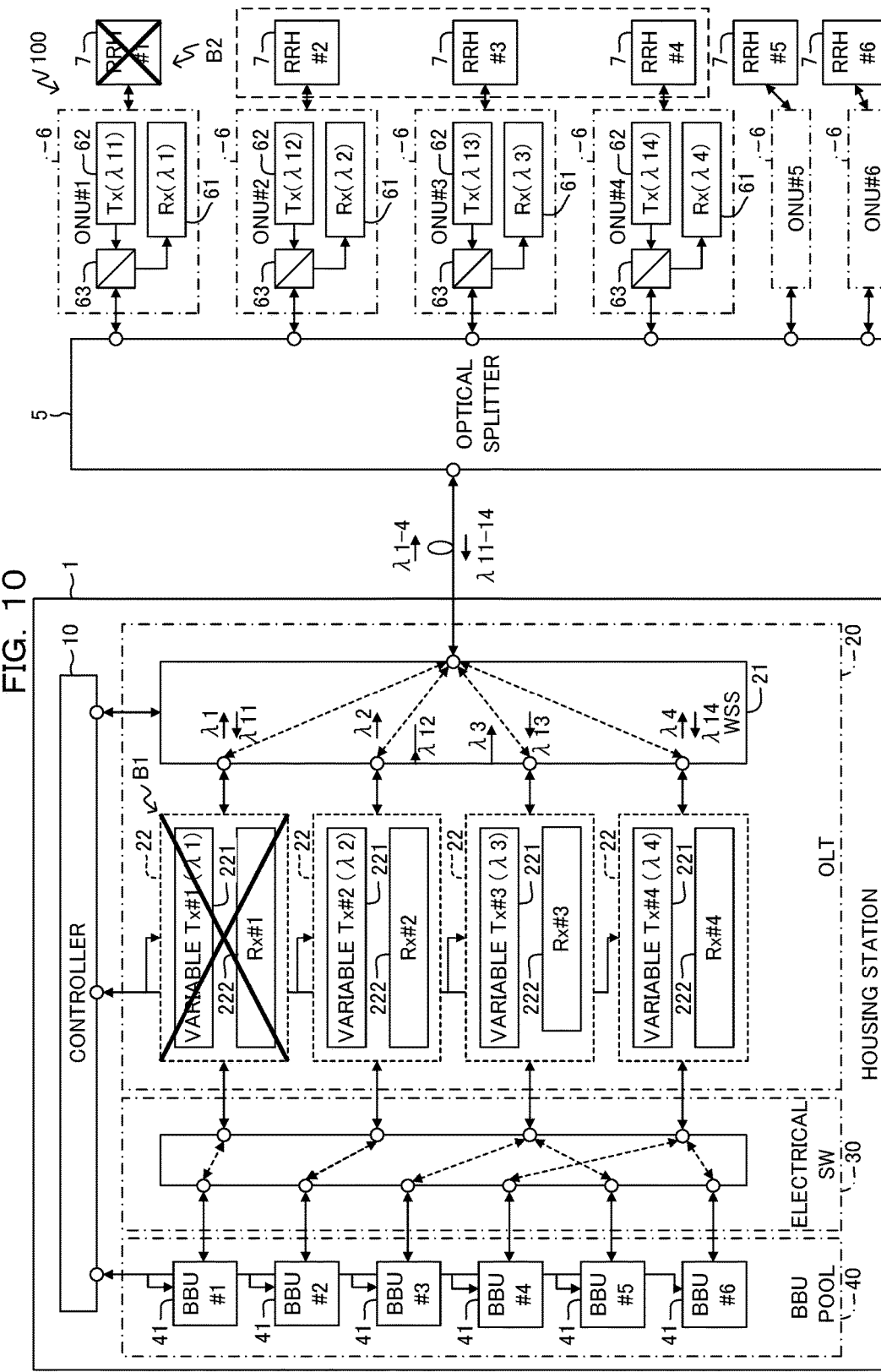
FIG. 10 is a diagram for describing faults occurring in a transceiving module of the optical communication system illustrated in FIG. 5.

In the above-described embodiment, although an example in which a fault occurs in the optical transceiving module 22 including the optical transmitter #1 that transmits signal light of a shortest wavelength among the optical transmitters 221 with reference to FIGS. 10 and 11 has been described, the present invention is not limited to this.

For example, even when a fault occurs in the optical transceiving module 22 including the optical transmitter #4 that transmits signal light of the longest wavelength among the optical transmitters 221, the optical communication system 100 of the above-described embodiment can be used. In this case, the optical transmitter #3 that transmits light of the wavelength $\lambda$3 adjacent to the wavelength $\lambda$4 of the signal light transmitted by the optical transmitter #4 may be selected as the optical transmitter 221 that transmits the shared wavelength $\lambda$3-4.

In the optical communication system 100 of the modification, a case in which a fault occurs in the optical transceiving module 22 including the optical transmitter #2 in which there are two optical transmitter 221 that transmit signal light of adjacent wavelengths will be described.

Figure 14:
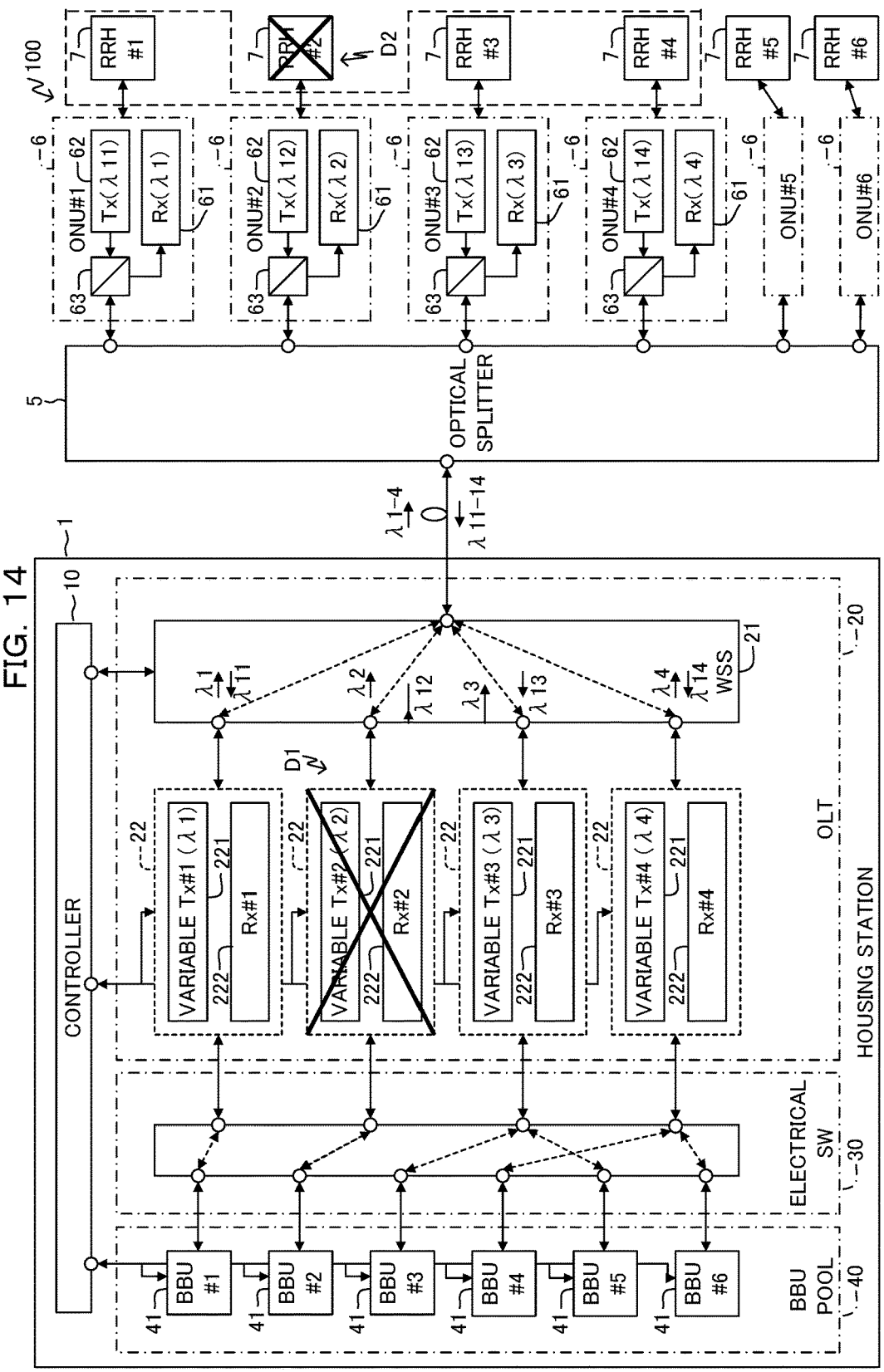
FIG. 14 is a diagram for describing faults occurring in a transceiving module of an optical communication system according to a modification.

FIG. 14 is a diagram for describing faults occurring in the optical transceiving module 22 of the optical communication system 100 of the modification.

In the example illustrated in FIG. 14, a fault such as a trouble occurs in the optical transceiving module 22 including the optical transmitter #2 and the optical receiver #2 of the housing station 1 (see symbol D1). In this way, the ONU #2 that communicates with the faulty optical transceiving module 22 is not capable of transmitting and receiving signal light to and from the housing station 1. Moreover, the RRH #2 connected to the ONU #2 is not capable of performing inter-cell cooperative transmission with the RRHs #1, #3, and #4 (see symbol D2).

In this case, although the RRHs #1, #3, and #4 excluding the RRH #2 perform inter-cell cooperative transmission, a mobile user in which the throughput decreases greatly unless the RRH #2 is used may occur. Therefore, in the optical communication system 100 of the modification, the RRH #2 may be recovered.

Figure 15:
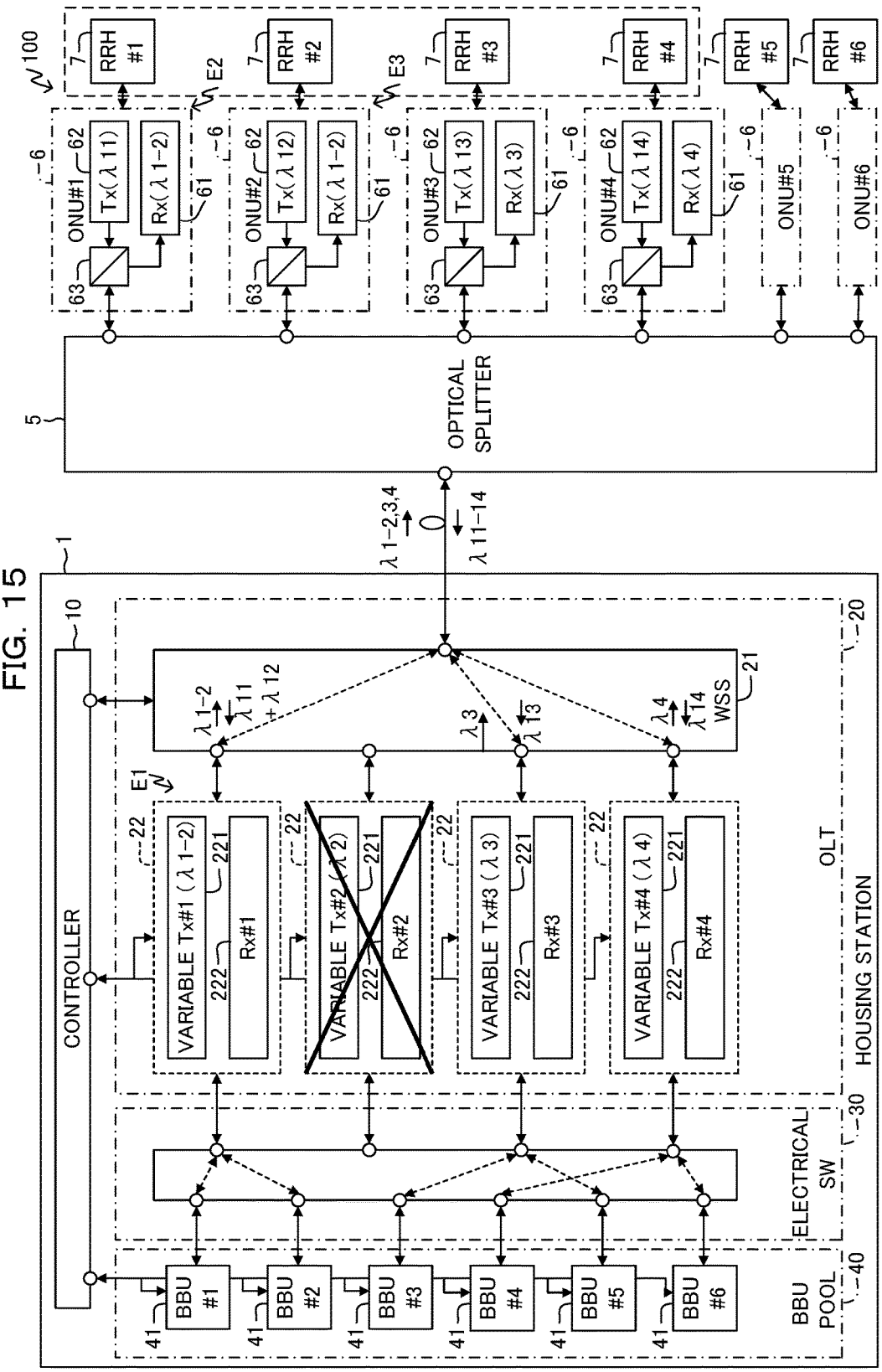
FIG. 15 is a diagram for describing a first example of an operation of handling the faults illustrated in FIG. 14.

FIG. 15 is a diagram for describing a first example of an operation of handling the fault illustrated in FIG. 14.

The universal monitor control unit 111 may select the optical transmitter #1 as the optical transmitter 221 that uses the shared wavelength $\lambda$1-2.

The WSS monitor control unit 136 may broaden the downlink transmission band of the port of the WSS 21 connected to the optical transceiving module 22 including the optical transmitter #1 and the optical receiver #1 up to a band in which the shared wavelength $\lambda$1-2 can pass. The "downlink transmission band" may mean a "transmission band from the housing station 1 toward the ONU 6".

The optical transceiver monitor control unit 135 may gradually change the wavelength $\lambda$1 of the signal light transmitted by the optical transmitter #1 up to the shared wavelength $\lambda$1-2 (see symbol E1). In this way, the optical receiver 61 of the ONU #1 and the optical receiver 61 of the ONU #2 receive the signal light of the wavelength $\lambda$1-2 (see symbols E2 and E3).

The WSS monitor control unit 136 may narrow the downlink transmission band of the port of the WSS 21 connected to the optical transceiving module 22 including the optical transmitter #1 and the optical receiver #1 up to a band in which the signal light of the shared wavelength λ1-2 only can pass.

The WSS monitor control unit 136 may broaden the uplink transmission band of the port of the WSS 21 connected to the optical transceiving module 22 including the optical transmitter #1 and the optical receiver #1 up to a band in which the signal light of the wavelength λ12 that the faulty optical receiver #2 receives can pass. The "uplink transmission band" may mean a "transmission band from the ONU 6 toward the housing station 1".

With the above-described operation, the RRHs #1, #3, and #4 may add the RRH #2 which can perform communication to the inter-cell cooperative transmission and perform inter-cell cooperative transmission which does not use the faulty optical transmitter #2 and the faulty optical receiver #2.

Figure 16:
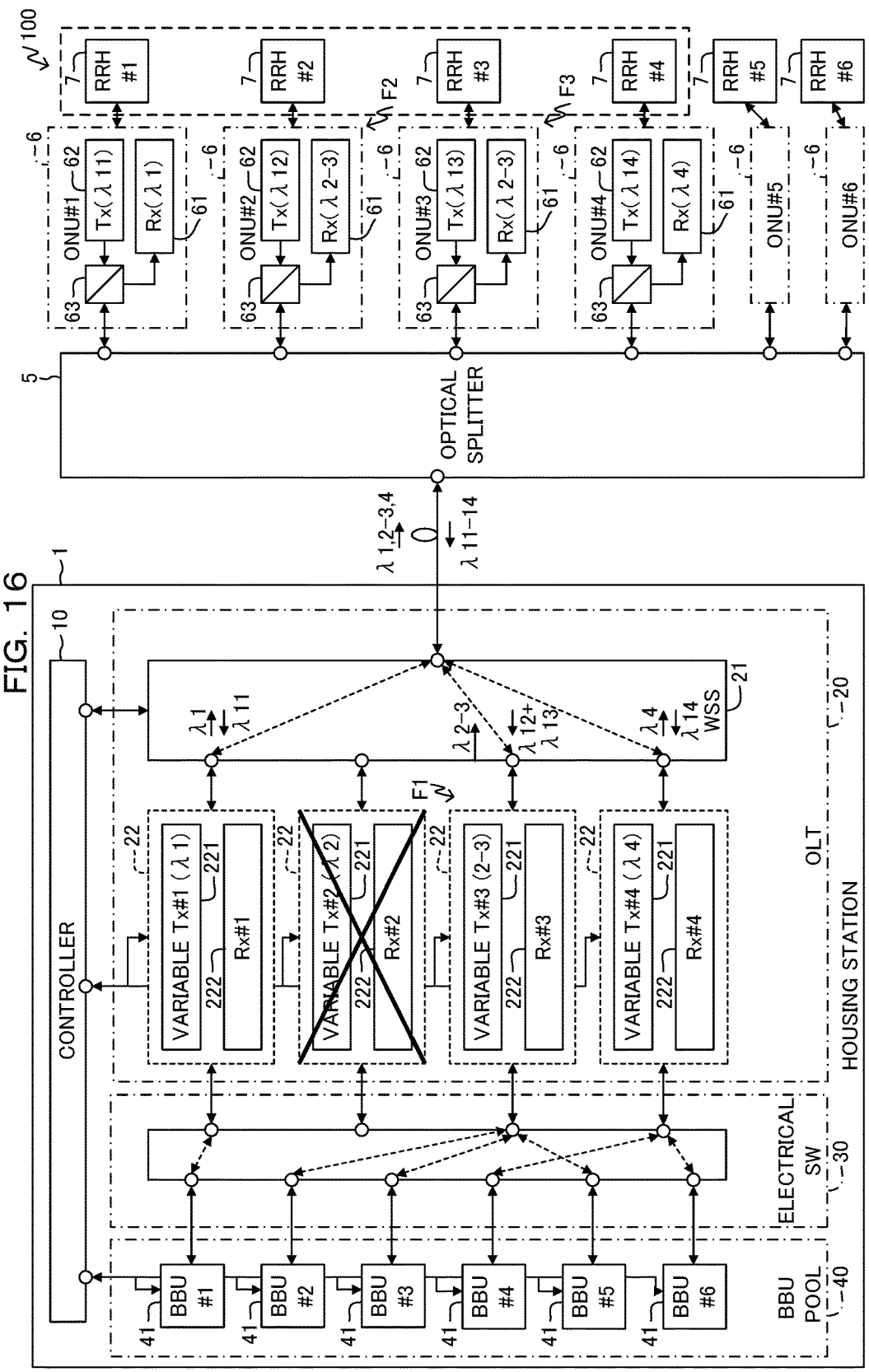
FIG. 16 is a diagram for describing a second example of an operation of handling the faults illustrated in FIG. 14.

FIG. 16 is a diagram for describing a second example of an operation of handling the fault illustrated in FIG. 14.

The universal monitor control unit 111 may select the optical transmitter #3 as the optical transmitter 221 that uses the shared wavelength λ2-3.

The WSS monitor control unit 136 may broaden the downlink transmission band of the port of the WSS 21 connected to the optical transceiving module 22 including the optical transmitter #3 and the optical receiver #3 up to a band in which the shared wavelength λ2-3 can pass.

The optical transceiver monitor control unit 135 may gradually change the wavelength λ3 of the signal light transmitted by the optical transmitter #3 up to the shared wavelength λ2-3 (see symbol F1). In this way, the optical receiver 61 of the ONU #2 and the optical receiver 61 of the ONU #3 receive the signal light of the wavelength λ2-3 (see symbols F2 and F3).

The WSS monitor control unit 136 may narrow the downlink transmission band of the port of the WSS 21 connected to the optical transceiving module 22 including the optical transmitter #3 and the optical receiver #3 up to a band in which the signal light of the shared wavelength λ2-3 only can pass.

The WSS monitor control unit 136 may widen the uplink transmission band of the port of the WSS 21 connected to the optical transceiving module 22 including the optical transmitter #3 and the optical receiver #3 up to a band in which the signal light of the wavelength λ12 that the faulty optical receiver #2 receives can pass.

With the above-described operation, the RRHs #1, #3, and #4 may add the RRH #2 which can perform communication to the inter-cell cooperative transmission and perform inter-cell cooperative transmission which does not use the faulty optical transmitter #2 and the faulty optical receiver #2.

When a fault occurs in the optical transceiving module 22 including the optical transmitter #3 in which there are two optical transmitter 221 that transmit signal light of adjacent wavelengths, the optical transmitters #2 or #4 may be selected as the optical transmitter 221 that transmits light of the shared wavelength.

The universal monitor control unit 111 may select the optical transmitter 221 that transmits light of the shared wavelength based on the communication state between the connected ONUs 6.

In this way, when there is a number of optical transmitters 221 that transmits light of a wavelength adjacent to the wavelength of the signal light transmitted by the faulty optical transmitter 221, it is possible to appropriately select the optical transmitter 221 that transmits light of the shared wavelength.

As an example, the universal monitor control unit 111 may select the optical transmitter 221 in which the mobile traffic amount (that is, a "communication amount") between the connected ONUs 6 is small as the optical transmitter 221 that transmits light of the shared wavelength. Moreover, the universal monitor control unit 111 may select the optical transmitter 221 in which the number of connected ONUs 6 is the smallest as the optical transmitter 221 that transmits the light of the shared wavelength.

In this way, when the optical transmitter 221 that transmits light of the shared wavelength is selected from a plurality of candidates, it is possible to distribute the load of the optical communication system 100.

FIG. 17 is a diagram illustrating traffic information of the optical communication system 100 according to the modification in a table form.

In traffic information, a "connected ONU," a "peak traffic (Gbps)," and a "used traffic (Gbps)" may be correlated with each RRH 7.

The "connected ONU" indicates the ONU 6 connected to each RRH 7 as an example. In the example illustrated in FIG. 17, the ONUs #1 to #6 are connected to the RRHs #1 to #6, respectively.

The "peak traffic (Gbps)" indicates a largest mobile traffic amount in a certain period as an example. In the example illustrated in FIG. 17, the peak traffic of the RRHs #1 to #6 is 10 Gbps.

The "used traffic (Gbps)" indicates a mobile traffic amount used at a certain time point as an example. In the example illustrated in FIG. 17, the used traffic of the RRHs #1 to #4 is 3 Gbps and the used traffic of the RRHs #5 and #6 is 0.5 Gbps. The "used traffic (Gbps)" may be an average value of the traffic amounts in a certain period.

FIG. 18 is a diagram illustrating wavelength information of the optical communication system 100 according to the modification in a table form.

The wavelength information illustrated in (1) of FIG. 18 may be created based on the traffic information illustrated in FIG. 17.

In the wavelength information illustrated in (1) of FIG. 18, an "allocated downlink wavelength" and a "used band (Gbps)" are correlated with each ONU 6.

The "allocated downlink wavelength" indicates the wavelength of signal light transmitted from the housing station 1 to each ONU 6 as an example. In the example illustrated in (1) of FIG. 18, the wavelengths λ1, λ2, λ3, λ4, λ3, and λ4 are correlated with the ONUs #1 to #6, respectively.

The "used band (Gbps)" corresponds to the "used traffic (Gbps)" illustrated in FIG. 18 and indicates a band used for communication with each ONU 6 at a certain time point as an example. In the example illustrated in (1) of FIG. 18, the used band of the communication with the ONUs #1 to #4 is 3 Gbps, and the used band of the communication with the ONUs #5 and #6 is 0.5 Gbps.

The wavelength information illustrated in (2) of FIG. 18 may be created based on the traffic information illustrated in FIG. 17 and the wavelength information illustrated in (1) of FIG. 18.

In the wavelength information illustrated in (2) of FIG. 18, the "number of connected ONUs," a "maximum band (Gbps)," and a "used band (Gbps)" are correlated with each wavelength.

The "number of connected ONUs" indicates the number of ONUs 6 connected to the housing station 1 using each wavelength. In the example illustrated in (1) of FIG. 18, the number of ONUs 6 connected using wavelengths λ1 and λ2 each is 1, and the number of ONUs 6 connected using wavelengths λ3 and λ4 each is 2.

The "maximum band (Gbps)" corresponds to the "peak traffic (Gbps)" illustrated in FIG. 18 and indicates the maximum band used for communication using each wavelength in a certain period as an example. In the example illustrated in (2) of FIG. 18, the maximum band of the communication using wavelengths λ1 to λ4 each is 10 Gbps.

The "used band (Gbps)" corresponds to the "used traffic (Gbps)" illustrated in FIG. 18 and indicates the band (or an average band in a certain period) used for communication using each wavelength at a certain time point. In the example illustrated in (2) of FIG. 18, the used band of the communication using wavelengths λ1 and λ2 each is 3 Gbps, and the used band of the communication using wavelengths λ3 and λ4 each is 3.5 Gbps.

The universal monitor control unit 111 may select a plurality of optical transmitters 221 that transmits light of wavelengths adjacent to the wavelength of the light transmitted by the faulty optical transmitter 221 as a plurality of candidates for the optical transmitter 221 that transmits the light of the shared wavelength. Moreover, the universal monitor control unit 111 may select the optical transmitter 221 that transmits signal light of a wavelength of which the used band is the smallest among the plurality of selected candidates as the optical transmitter 221 that transmits light of the shared wavelength.

When a number of optical transmitters 221 that transmits signal light of a wavelength of which the used band is the smallest are included in the plurality of selected candidates, the universal monitor control unit 111 may select the optical transmitter 221 that transmits signal light of a wavelength in which the number of connected ONUs is the smallest as the optical transmitter 221 that transmits light of the shared wavelength.

In (2) of FIG. 18, the optical transmitter #1 that transmits signal light of the wavelength λ1 of which the used band is the smallest among the wavelengths λ1 and λ3 adjacent to the wavelength λ2 of the signal light transmitted by the faulty optical transmitter #2 may be selected as the optical transmitter 221 that transmits light of the shared wavelength λ1-2.

[C] Others

The technology of this disclosure is not limited to the embodiment described above, and may be carried out in various modified forms without departing from the spirit of each embodiment. Each configuration and each processing of this embodiment may be accepted or rejected in accordance with the necessity, or may be combined appropriately.

As one aspect, it is possible to improve the availability of an optical communication system with a simple configuration.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical communication system comprising:
a transmission station having
a plurality of optical transmitters, including an optical transmitter that transmits light having a first wavelength different from a second wavelength,
a switch that delivers the light of wavelengths transmitted by the optical transmitters by allowing the light to pass therethrough,
a wavelength controller that performs control to change the first wavelength of the light transmitted by the optical transmitter to a third wavelength between the first wavelength and the second wavelength, and
a switch controller that causes the switch to allow the light of the first wavelength and the third wavelength transmitted from the optical transmitter to pass through the switch and causes the switch to limit the wavelength of the light allowed to pass through to the third wavelength when the wavelength controller performs control to change the wavelength of the light transmitted by the optical transmitter;
a plurality of optical receivers; and
a splitter that splits the light transmitted by the optical transmitter to the plurality of optical receivers, wherein
the optical transmitter includes a variable-wavelength light source capable of transmitting the light of the first wavelength and the third wavelength,
a first optical receiver of the plurality of optical receivers includes:
a first optical filter having a first transmission band including the first and third wavelengths; and
a first receiving unit that receives the light having passed through the first optical filter, and
a second optical receiver of the plurality of optical receivers includes:
a second optical filter having a second transmission band including the second and third wavelengths; and
a second receiving unit that receives the light having passed through the second optical filter.

2. The optical communication system according to claim 1, wherein
the plurality of optical receivers are provided in a plurality of reception stations, respectively,
two of the plurality of reception stations each include:
a first reception-station-side transmitter that transmits the light of a fourth wavelength to the transmission station; and
a second reception-station-side transmitter that transmits the light of a fifth wavelength to the transmission station, and
the transmission station further includes a transmission-station-side receiver that receives the light of the fourth wavelength transmitted from the first reception-station-side transmitter and the light of the fifth wavelength transmitted from the second reception-station-side transmitter.

3. The optical communication system according to claim 1, further comprising:
a first wireless transmission point that wirelessly transmits a signal received by the first receiving unit; and
a second wireless transmission point that wirelessly transmits a signal received by the second receiving unit,
wherein the first and second wireless transmission points perform the wireless transmission in cooperation.

4. The optical communication system according to claim 1, wherein the wavelength controller selects the optical transmitter from a plurality of candidates based on a communication state between the plurality of optical receivers and the plurality of candidates including a first transmission-station-side optical transmitter that transmits the light of neighboring wavelengths adjacent to a short-wavelength side of the second wavelength and a second transmission-station-side optical transmitter that transmits the light of neighboring wavelengths adjacent to a long-wavelength side of the second wavelength.

5. The optical communication system according to claim 4, wherein the communication state includes a communication amount between each of the plurality of candidate transmission-station-side optical transmitters and a corresponding optical receiver.

6. The optical communication system according to claim 4, wherein the communication state includes the number of the optical receivers with which each of the plurality of candidate transmission-station-side optical transmitters communicates.

7. A transmission station, connected to a splitter that splits light received from the transmission station to a plurality of optical receivers, comprising:
   a plurality of optical transmitters, including an optical transmitter connected to the splitter, wherein the optical transmitter includes a variable-wavelength light source capable of transmitting the light of a first wavelength, different from a second wavelength, and the light of a third wavelength between the first wavelength and the second wavelength;
   a wavelength controller that performs control to change the wavelength of the light transmitted by the optical transmitter from the first wavelength to the third wavelength;
   a switch that delivers the light of wavelengths transmitted by the transmission-station-side optical transmitters by allowing the light to pass therethrough; and
   a switch controller that causes the switch to allow the light of the first and third wavelengths transmitted from the optical transmitter to pass through the switch and causes the switch to limit the wavelength of the light allowed to pass through to the third wavelength when the wavelength controller performs control to change the wavelength of the light transmitted by the optical transmitter, wherein
   the light of the first and third wavelengths is receivable by a first optical receiver among the plurality of optical receivers, and
   the light of the second and third wavelengths is receivable by a second optical receiver among the plurality of optical receivers.

8. The transmission station according to claim 7, wherein the wavelength controller selects the optical transmitter from a plurality of candidates based on a communication state between the plurality of optical receivers and the plurality of candidates including a first transmission-station-side optical transmitter that transmits the light of neighboring wavelengths adjacent to a short-wavelength side of the second wavelength and a second transmission-station-side optical transmitter that transmits the light of neighboring wavelengths adjacent to a long-wavelength side of the second wavelength.

9. The transmission station according to claim 8, wherein the communication state includes a communication amount between each of the plurality of candidate transmission-station-side optical transmitters and a corresponding optical receiver.

10. The transmission station according to claim 8, wherein the communication state includes the number of the optical receivers with which each of the plurality of candidate transmission-station-side optical transmitters communicates.

11. The transmission station according to claim 7, wherein
   the plurality of optical receivers are provided in a plurality of reception stations, respectively,
   two of the plurality of reception stations each include:
      a first reception-station-side transmitter that transmits the light of a fourth wavelength to the transmission station; and
      a second reception-station-side transmitter that transmits the light of a fifth wavelength, and
   the transmission station further includes a transmission-station-side receiver that receives the light of the fourth wavelength transmitted from a first reception-station-side transmitter provided in any one of the plurality of reception stations and the light of the fifth wavelength transmitted from the second reception-station-side transmitter provided in any one of the plurality of reception stations.

12. A method of optical communication comprising:
   performing control to change a wavelength of light transmitted by an optical transmitter in a transmission station from a first wavelength, different from a second wavelength, to a third wavelength between the first wavelength and the second wavelength;
   selectively transmitting the light of the first wavelength and the light of the third wavelength from the optical transmitter, including
      delivering the light of the first and third wavelengths transmitted by the optical transmitter by allowing the light to pass through the transmission station, and
      limiting the wavelength of the light allowed to pass through the transmission station to the third wavelength when the control to change the wavelength of the light transmitted by the optical transmitter is performed;
   splitting the light transmitted from the optical transmitter to a plurality of optical receivers using a splitter;
   receiving, at a first optical receiver among the plurality of optical receivers, the light that passed through a first optical filter having a first transmission band including the first wavelength and the third wavelength; and
   receiving, at a second optical receiver among the plurality of optical receivers, the light that passed through a second optical filter having a second transmission band including the second wavelength and the third wavelength.

13. The method of optical communication according to claim 12, wherein
   the optical transmitter is one of a plurality of transmission-station-side optical transmitters provided in the transmission station,
   the method further comprises selecting the optical transmitter from a plurality of candidates based on a communication state between the plurality of optical receivers, the plurality of candidates including a first transmission-station-side optical transmitter that transmits the light of neighboring wavelengths adjacent to a short-wavelength side of the second wavelength and a second transmission-station-side optical transmitter that transmits the light of neighboring wavelengths adjacent to a long-wavelength side of the second wavelength.

14. The method of optical communication according to claim 13, wherein the communication state includes a communication amount between each of the plurality of candidate transmission-station-side optical transmitters and a corresponding optical receiver.

15. The method of optical communication according to claim 13, wherein the communication state includes the number of the optical receivers with which each of the plurality of candidate transmission-station-side optical transmitters communicates.

\* \* \* \* \*